(12) United States Patent
Tang et al.

(10) Patent No.: US 10,915,365 B2
(45) Date of Patent: Feb. 9, 2021

(54) DETERMINING A QUANTITY OF REMOTE SHARED PARTITIONS BASED ON MAPPER AND REDUCER NODES

(71) Applicant: Huawei Technologies Co., Ltd., Shenzhen (CN)

(72) Inventors: Jiyuan Tang, Shenzhen (CN); Wei Wang, Hangzhou (CN); Yi Cai, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 221 days.

(21) Appl. No.: 16/006,503

(22) Filed: Jun. 12, 2018

(65) Prior Publication Data
US 2018/0293108 A1  Oct. 11, 2018

Related U.S. Application Data

(63) Continuation of application No. PCT/CN2015/100081, filed on Dec. 31, 2015.

(51) Int. Cl.
*G06F 9/50* (2006.01)
*G06F 15/167* (2006.01)
(Continued)

(52) U.S. Cl.
CPC .......... *G06F 9/5027* (2013.01); *G06F 9/5061* (2013.01); *G06F 15/167* (2013.01); *G06F 3/0604* (2013.01); *G06F 3/067* (2013.01); *G06F 9/5066* (2013.01); *G06F 16/182* (2019.01); *G06F 2209/5011* (2013.01)

(58) Field of Classification Search
None
See application file for complete search history.

(56) References Cited

U.S. PATENT DOCUMENTS 8,954,967 B2 * 2/2015 Balmin ................. G06F 9/5066
  718/100
9,147,373 B2 * 9/2015 Cunningham ...... G06F 16/2471
(Continued)

FOREIGN PATENT DOCUMENTS

CN    1494688 A    5/2004
CN    101764835 A   6/2010
(Continued)

OTHER PUBLICATIONS

Cheng et al, StoreApp: Shared Storage Appliance for Efficient and Scalable Virtualized Hadoop Clusters, 2015, pp. 1-11 (Year: 2015).*
(Continued)

*Primary Examiner* — Abu Zar Ghaffari
(74) *Attorney, Agent, or Firm* — Conley Rose, P.C.

(57) ABSTRACT

A mapper node and a reducer node respectively run on different central processing units (CPUs) in a CPU pool, and a remote shared partition shared by the mapper node and the reducer node is delimited in the storage pool. The mapper node executes a map task to obtain a data segment, and stores the data segment into a remote shared partition. The reducer node directly obtains a to-be-processed data segment from the remote shared partition, and executes a reduce task on the to-be-processed data segment.

17 Claims, 7 Drawing Sheets

(51) Int. Cl.
*G06F 3/06* (2006.01)
*G06F 16/182* (2019.01)

(56) References Cited

U.S. PATENT DOCUMENTS

| | | | | |
|---|---|---|---|---|
| 9,753,783 | B2* | 9/2017 | Kim | G06F 9/5066 |
| 9,886,310 | B2* | 2/2018 | Fuller | G06F 9/5011 |
| 9,910,860 | B2* | 3/2018 | Eltabakh | G06F 16/182 |
| 10,291,696 | B2* | 5/2019 | Ying | H04L 67/1061 |
| 10,375,161 | B1* | 8/2019 | Tan | H04L 49/70 |
| 2004/0103218 | A1 | 5/2004 | Blumrich et al. | |
| 2013/0253888 | A1 | 9/2013 | Yang et al. | |
| 2013/0290957 | A1 | 10/2013 | Li et al. | |
| 2013/0332612 | A1 | 12/2013 | Cai et al. | |
| 2014/0123115 | A1 | 5/2014 | Peretz | |
| 2014/0201114 | A1* | 7/2014 | Tamano | G06N 20/00 706/12 |
| 2014/0236977 | A1 | 8/2014 | Deutsch | G06F 16/90 707/758 |
| 2014/0333638 | A1* | 11/2014 | Kaminski | G06F 15/17 345/522 |
| 2014/0358869 | A1 | 12/2014 | Kim | |
| 2014/0358977 | A1 | 12/2014 | Cramer et al. | |
| 2015/0100412 | A1* | 4/2015 | Sterns | G06Q 30/0242 705/14.41 |
| 2015/0127649 | A1* | 5/2015 | Felch | G06F 12/0238 707/737 |
| 2015/0128150 | A1* | 5/2015 | Ueda | G06F 9/5066 718/105 |
| 2015/0150017 | A1* | 5/2015 | Hu | G06F 12/00 718/103 |
| 2015/0356157 | A1* | 12/2015 | Anderson | G06F 16/258 707/756 |
| 2016/0092493 | A1* | 3/2016 | Ko | G06F 16/2471 707/693 |
| 2016/0103695 | A1* | 4/2016 | Udupi | G06F 9/45558 718/1 |
| 2017/0004163 | A1* | 1/2017 | Gupta | G06F 16/24553 |

FOREIGN PATENT DOCUMENTS

| | | |
|---|---|---|
| CN | 102209087 A | 10/2011 |
| CN | 102255962 A | 11/2011 |
| CN | 102663207 A | 9/2012 |
| CN | 103324533 A | 9/2013 |
| CN | 103377091 A | 10/2013 |
| CN | 104331322 A | 2/2015 |
| CN | 104331330 A | 2/2015 |
| WO | 2011120791 A1 | 10/2011 |

OTHER PUBLICATIONS

Li et al, MapReduce Parallel Programming Model:A State-of-the-Art Survey, 2014, Int J Parallel Prog (2016) 44:832-866 (Year: 2014).*
Sakr et al, The Family of MapReduce and Large-Scale Data Processing Systems, 2013, ACM, Comput. Surv. 46, 1, Article 11 (Oct. 2013), 44 pages (Year: 2013).*
Stack_overflow_hadoop—Storing mapreduce intermediate output on a remote server—Stack Overflow, 2014 (Year: 2014).*
Ko et al, On Availability of Intermediate Data in Cloud Computations, 2009 (Year: 2009).*
Machine Translation and Abstract of Chinese Publication No. CN101764835, Jun. 30, 2010, 11 pages.
Machine Translation and Abstract of Chinese Publication No. CN102255962, Nov. 23, 2011, 11 pages.
Machine Translation and Abstract of Chinese Publication No. CN103324533, Sep. 25, 2013, 14 pages.
Machine Translation and Abstract of Chinese Publication No. CN104331322, Feb. 4, 2015, 34 pages.
Machine Translation and Abstract of Chinese Publication No. CN104331330, Feb. 4, 2015, 34 pages.
Chao, L., et al., "Graph data processing technology in cloud platform," Journal of Computer Applications, vol. 35, No. 1, Jan. 10, 2015, pp. 43-47.
Jiang, D., et al., "The Performance of MapReduce: An Indepth Study," Proceedings of the VLDB Endowment, vol. 3, No. 1, The 36th International Conference on Very Large Data Bases, Sep. 13-17, 2010, pp. 472-483.
Foreign Communication From A Counterpart Application, PCT Application No. PCT/CN2015/100081, English Translation of International Search Report dated Sep. 30, 2016, 3 pages.
Foreign Communication From A Counterpart Application, European Application No. 15911904.9, Extended European Search Report dated Nov. 21, 2018, 9 pages.

* cited by examiner

DETERMINING A QUANTITY OF REMOTE SHARED PARTITIONS BASED ON MAPPER AND REDUCER NODES

CROSS-REFERENCE TO RELATED APPLICATION

This application is a continuation of International Patent Application No. PCT/CN2015/100081 filed on Dec. 31, 2015, which is hereby incorporated by reference in its entirety.

TECHNICAL FIELD

This application relate to the computer field, and in particular, to a data processing method and apparatus, and a system.

BACKGROUND

Map/Reduce is a programming model, used for parallel computing of massive datasets, for example, parallel computing of datasets of more than 1 terabyte (TB).

During dataset processing, a dataset is divided into multiple data slices, and a master node (master) schedules worker nodes (worker) to process the data slices. The master assigns a map task (map task) to an idle worker, and a worker to which the map task has been assigned becomes a mapper node. In addition, the master assigns a reduce task to another idle worker, and a worker to which the reduce task has been assigned becomes a reducer node. The mapper node temporarily stores a result of executing the map task into a circular memory buffer, and spills the result in the circular memory buffer into a disk using a disk input/output (I/O). One spill file is obtained during each time of spilling. In a process of spilling to generate spill files, the mapper node separately partitions and sorts results in the circular memory buffer according to key values processed by all reducer nodes. After completing execution of the map task, the mapper node reads the spill files in the disk, merges the spill files into one file, and writes the merged file into the disk again. Therefore, in processes of partitioning, sorting, and merging, a disk I/O may be used for multiple times to perform disk read/write operations. The mapper node notifies the master when completing execution of the map task, and then the master notifies the reducer node of an identity of the mapper node. The reducer node requests data from the mapper node according to the identity, the mapper node and the reducer node establish a Transmission Control Protocol (TCP) stream, and the mapper node reads data to be processed by the reducer node from the file stored in the disk, and sends the read data to the reducer node using the TCP stream. In a process in which the mapper node sends the data to the reducer node using the TCP stream, the mapper node needs to use a disk I/O to read data from the disk, and use a network I/O to transmit the TCP stream carrying the data to the reducer node. However, performing disk read/write operations using a disk I/O and transmitting data to the reducer node using a network I/O are very time-consuming, leading to that an execution time for completing the Map/Reduce task.

SUMMARY

In view of this, this application provides a data processing method and apparatus, and a system in order to reduce an execution time of a Map/Reduce task.

According to one aspect, this application provides a data processing method. A system to which the method is applicable includes a storage pool, and a remote shared partition is delimited in the storage pool. The method includes executing, by a mapper node, a map task, and storing a data segment obtained by executing the map task, into the remote shared partition, and directly obtaining, by a reducer node, the data segment from the remote shared partition, and executing a reduce task on the data segment. The mapper node and the reducer node herein may run on a same central processing unit (CPU), or may run on different CPUs. In addition, the CPU may belong to a non-decoupled computer device, or may belong to a CPU pool.

It may be learned that the method provided in this application omits some actions in the other approaches, and shortens a time for executing the Map/Reduce task. The omitted actions include writing, by the mapper node, an execution result of the map task into a local disk using a disk I/O, when the reducer node requests the execution result, reading the execution result of the map task from the local disk using the disk I/O, and sending a TCP stream carrying the execution result to the reducer node using a network I/O.

In a possible design, the system to which the method is applicable includes the CPU pool and the storage pool, the CPU pool is communicatively connected to the storage pool, and further, a communicative connection between the CPU pool and the storage pool may be implemented by means of message communication between a controller of the CPU pool and a controller of the storage pool. The CPU pool also has multiple CPUs, and communication between two CPUs in the CPU pool is implemented using the controller of the CPU pool. The mapper node and the reducer node run on different CPUs in the CPU pool.

There are multiple mapper nodes, and herein a first mapper node is used to indicate any mapper node in the multiple mapper nodes. There are also multiple reducer nodes, and herein a first reducer node is used to indicate any reducer node in the multiple reducer nodes. The following describes the method in this application using the first mapper node and the first reducer node as examples.

The first mapper node executes a map task on a data slice, and obtains at least one data segment according to an execution result of the map task. Each of the at least one data segment is to be processed by a corresponding reducer node, and different data segments are to be processed by different reducer nodes. A first data segment is a data segment to be processed by the first reducer node in the at least one data segment.

The first mapper node stores the data segment into the remote shared partition. A storage implementation includes creating a file in the remote shared partition for each of the data segments, and writing each data segment into the file created for the data segment. Therefore, a file including the first data segment is stored in the remote shared partition.

After learning that the first mapper node stores the first data segment into the remote shared partition, the first reducer node sends a data request message to the first mapper node.

The first mapper node receives the data request message sent by the first reducer node, and responds to the data request message. A specific responding manner may include generating a response message according to an identifier, carried in the data request message, of the first reducer node, and feeding back the response message to the first reducer node.

The first reducer node receives the response message fed back by the first mapper node. Because the response message carries a partition name of the remote shared partition that stores the first data segment and a file name of a file including the first data segment, the first reducer node mounts the remote shared partition according to the partition name carried in the response message, finds the file including the first data segment in the remote shared partition according to the partition name carried in the response message, and reads the first data segment from the file. By analogy, the mapper nodes store the data segments to be processed by the first reducer node into the remote shared partition. Therefore, the first reducer node may obtain all the data segments (including the first data segment) to be processed by the first reducer node from the remote shared partition, and execute the reduce task on all the obtained data segments.

In this design, the mapper node and the reducer node run on different CPUs in the CPU pool, and communicate with each other using a message. In comparison with execution of the Map/Reduce task on a non-decoupled CPU, if the CPU pool has massive CPU resources, more CPUs may be allocated to execute the Map/Reduce task in this application such that time of the Map/Reduce task may be shortened, and the Map/Reduce task can be executed on a larger dataset at a time.

In a possible design, after completing execution of the map task, the first mapper node stores the data segment into the remote shared partition, and notifies, using a message, a master node that the first mapper node has completed the map task, then, the first reducer node learns, from the master node, that the first mapper node has completed the map task, and when learning that the first mapper node has completed the map task, learns that the first mapper node has stored the first data segment into the remote shared partition in order to send the data request message to the first reducer node.

In a possible design, the storage pool is a memory pool. In comparison with the other approaches, a speed of reading/writing data from/into the remote shared partition (belonging to the storage pool) by the mapper node and the reducer node is higher than a speed of reading/writing data from/into the local disk, thereby further shortening the time for executing the Map/Reduce task.

In a possible design, both the mapper node and the reducer node access the remote shared partition in a mounting manner, and stop accessing the remote shared partition in an unmounting manner after access.

In a possible design, the storage pool includes a first remote private partition exclusive to the first mapper node, that is, another mapper node or reducer node cannot access the first remote private partition.

A specific implementation of the obtaining, by the first mapper node, at least one data segment according to an execution result of the map task includes spilling, by the first mapper node in a process of executing the map task, data stored in a buffer, where one spill file is obtained during one time of spilling, and in this design, the spill file that is obtained by means of spilling is stored into the first remote private partition of the first mapper node, reading, by the first mapper node from the first remote private partition of the first mapper node, all spill files that are spilled at different time points after completing execution of the map task, respectively merging, according to key values corresponding to different reducer nodes, data slices included in all the spill files, and obtaining, by means of merging, different data segments to be respectively processed by all the reducer nodes.

Optionally, using the remote shared partition to store the spill file is an alternative of using the first remote private partition to store the spill file. An implementation of using the remote shared partition to store the spill file is similar to an implementation of using the first remote private partition to store the spill file, and details are not repeatedly described herein.

In a possible design, there are multiple remote shared partitions, and a quantity of the remote shared partitions is equal to a product of a quantity of the mapper nodes and a quantity of the reducer nodes, each remote shared partition is shared by one mapper node and one reducer node, different remote shared partitions are shared by different mapper nodes, or shared by different reducer nodes, or shared by both different mapper nodes and different reducer nodes. One remote shared partition is shared by the first mapper node and the first reducer node, and correspondingly, the first mapper node stores a file including the first data segment into the remote shared partition shared by the first mapper node and the first reducer node, and the first reducer node reads the first data segment from the remote shared partition shared by the first mapper node and the first reducer node.

In a possible design, the storage pool includes a second remote private partition exclusive to the first reducer node, that is, another reducer node or mapper node cannot access the second remote private partition.

In this design, optionally, after reading the first data segment from the remote shared partition, the first reducer node first stores the read first data segment into a local memory, and when usage of the local memory reaches preset usage, stores the first data segment subsequently read from the remote shared partition into the second remote private partition of the first reducer node.

In this design, optionally, the first reducer node reads the first data segment from the remote shared partition, and stores the read first data segment into the second remote private partition of the first reducer node.

According to another aspect, this application provides a computer device, where the computer device includes a processor and a memory, and the processor and the memory are connected using a bus, and the memory is configured to store a computer instruction, and when the computer device runs, the processor executes the computer instruction stored in the memory, to enable the computer device to perform the foregoing data processing method and the foregoing possible designs.

According to another aspect, this application provides a data processing apparatus. A system to which the apparatus is applicable is the same as the system to which the foregoing method is applicable. The apparatus is configured to implement a first mapper node, and the apparatus includes an obtaining unit, a storage unit, and a responding unit.

The obtaining unit is configured to execute a map task on a data slice, and obtain at least one data segment according to an execution result of the map task, where each of the at least one data segment is to be processed by a corresponding reducer node, the at least one data segment includes a first data segment, and the first data segment is a data segment to be processed by a first reducer node.

The storage unit is configured to store the first data segment into a remote shared partition in a format of a file.

The responding unit is configured to receive a data request message sent by the first reducer node, where the data request message includes an identifier of the first reducer node, respond to the data request message and generate a response message according to the identifier of the first reducer node, where the response message includes a partition name of the remote shared partition that stores the first data segment and a file name of the file including the first data segment, and feedback the response message to the first reducer node.

In a possible design, the storage pool includes a first remote private partition exclusive to a first mapper node.

When obtaining the at least one data segment according to an execution result of the map task, the obtaining unit is configured to store a spill file that is spilled when the first mapper node executes the map task, into the first remote private partition of the first mapper node, where a single spill file includes data that is spilled once from a buffer in a process in which the first mapper node executes the map task, and the buffer temporarily stores the execution result of the map task, and respectively merge, according to key values corresponding to different reducer nodes in the at least one reducer node, multiple spill files stored in the first remote private partition of the first mapper node, and obtain the at least one data segment by means of merging.

In a possible design, a quantity of remote shared partitions is equal to a product of a quantity of mapper nodes and a quantity of reducer nodes, and each remote shared partition is shared by one mapper node and one reducer node.

When storing the data segment into a remote shared partition in a format of a file, the storage unit is configured to store the file including the first data segment into a remote shared partition shared by the first mapper node and the first reducer node.

It should be noted that, according to the data processing apparatus provided in this aspect and the detailed designs, the units included in the apparatus can be used to implement functions of the first mapper node in the foregoing method.

According to another aspect, this application provides a data processing apparatus. A system to which the apparatus is applicable is the same as the system to which the foregoing method is applicable. The apparatus is configured to implement a first reducer node, and the apparatus includes a requesting unit, a receiving unit, and an execution unit.

The requesting unit is configured to send a data request message to the first mapper node after learning that the first mapper node stores a first data segment into the remote shared partition, where the data request message includes an identifier of the first reducer node, and the first data segment is a data segment that is to be processed by the first reducer node and that is in at least one data segment obtained by the first mapper node according to an execution result obtained after the first mapper node executes a map task.

The receiving unit is configured to receive a response message fed back by the first mapper node, where the response message includes a partition name of the remote shared partition that stores the first data segment and a file name of a file including the first data segment, and the response message is generated by the first mapper node according to the identifier of the first reducer node when the first mapper node responds to the data request message.

The execution unit is configured to obtain, according to the response information, the first data segment from the file stored in the remote shared partition, and execute a reduce task on the first data segment.

In a possible design, a quantity of remote shared partitions is equal to a product of a quantity of mapper nodes and a quantity of reducer nodes, and each remote shared partition is shared by one mapper node and one reducer node.

When obtaining, according to the response information, the first data segment from the file stored in the remote shared partition, the execution unit is configured to determine, according to the partition name in the response information, the remote shared partition shared by the first mapper node and the first reducer node, and read, according to the file name in the response information, the first data segment from the remote shared partition shared by the first mapper node and the first reducer node.

In a possible design, the storage pool includes a second remote private partition exclusive to the first reducer node.

The reducer node includes a storage switching unit, and the storage switching unit is configured to store the first data segment subsequently read from the remote shared partition into the second remote private partition of the first reducer node when storing the first data segment read from the remote shared partition into a local memory and when usage of the local memory reaches preset usage.

It should be noted that, according to the data processing apparatus provided in this aspect and the detailed designs, the units included in the apparatus can be used to implement functions of the first reducer node in the foregoing method.

According to another aspect, this application provides a system. The system is a system to which both the foregoing method and the foregoing apparatus are applicable. The system includes a memory pool, the foregoing first mapper node, and the foregoing first reducer node.

In comparison with the other approaches, the mapper node uses the remote shared partition in the storage pool to store the execution result of the map task, and the reducer node may directly read the execution result of the map task from the remote shared partition, thereby reducing the execution time of the Map/Reduce task.

DESCRIPTION OF EMBODIMENTS

The following describes the technical solutions in the embodiments of the present application with reference to the accompanying drawings in the embodiments of the present application. The described embodiments are some but not all of the embodiments of the present application. All other embodiments obtained by persons of ordinary skill in the art based on the embodiments of the present application shall fall within the protection scope of the present application.

Figure 1:
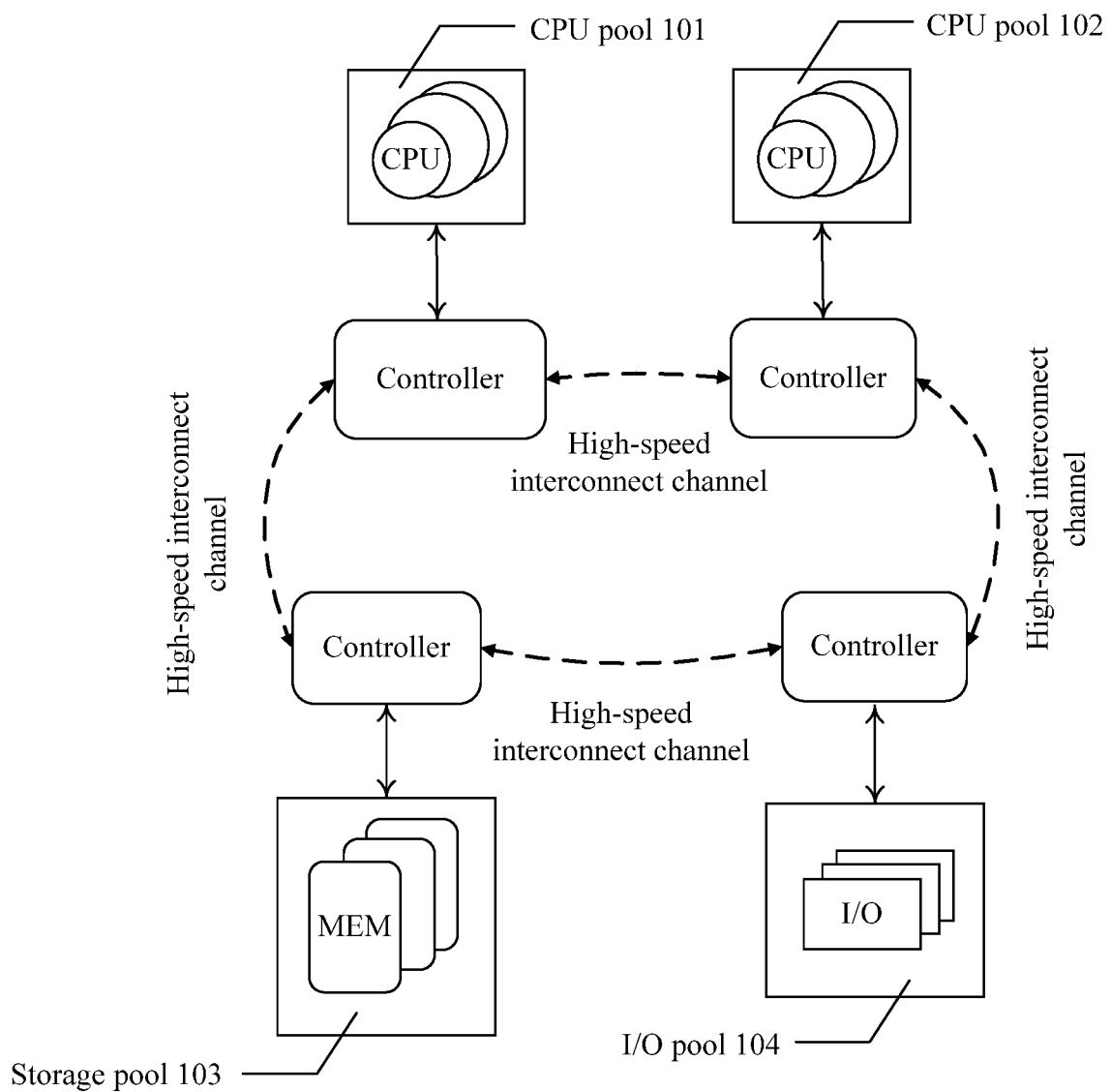
FIG. 1 is a schematic diagram of a system structure in a hardware decoupling scenario.

As shown in FIG. 1, CPUs, storage media, and I/O devices that are included in multiple computer devices are decoupled. Decoupled storage media form one or more storage pools 103 (FIG. 1 shows one storage pool 103), decoupled CPUs form one or more CPU pools (FIG. 1 shows a CPU pool 101 and a CPU pool 102), and decoupled I/O devices form one or more I/O pools 104 (FIG. 1 shows one I/O pool 104).

The storage media include various media capable of storing program code, such as a memory (designated as Mem), a removable hard disk, a read-only memory (ROM), a random access memory (RAM), and a magnetic disk or an optical disc. A computer device may have one or more storage media, and different computer devices may have different storage media. Therefore, the storage pool 103 usually includes more than one type of storage medium.

Optionally, to improve data read/write efficiency, the storage pool 103 includes only decoupled memories, and such a storage pool 103 is actually a memory pool.

A CPU included in the computer device may be a light core (for example, some Advanced reduced instruction set computing (RISC) Machine (ARM) series processors supporting only a single thread), or may be a many-core of a Many Integrated Core (MIC) architecture, or may be another core having a data processing capability. One computer device may have one or more types of cores, and different computer devices may have different cores. Correspondingly, a CPU pool may have one or more types of CPUs, such as a light core and an MIC.

Optionally, a local memory (not shown in FIG. 1) that is not decoupled to the storage pool 103 exists in the computer device. A CPU (generally configured in the same computer device with the local memory) that is in the CPU pool and connected to the local memory can access the local memory, and further, access the local memory using a memory bus. However, a CPU that is in the CPU pool but not connected to the local memory cannot access the local memory.

The computer device may have one or more I/O devices, such as a disk I/O device, a network I/O device, or another I/O device. Correspondingly, the I/O pool 104 may include one or more types of I/O devices.

As shown in FIG. 1, a controller connected to the CPU pool, a controller connected to the storage pool 103, and a controller connected to the I/O pool 104 are communicatively connected using a high-speed interconnect channel. The high-speed interconnect channel is optionally an optical channel that is set up using silicon photons. Certainly, the controllers may alternatively be communicatively connected using another medium or network, which shall not be construed as any limitation to the present application herein. When the controllers are communicatively connected, message exchange between components (a CPU in the CPU pool, a memory in the storage pool 103, and an I/O in the I/O pool 104) may be implemented by means of message exchange between the controllers.

The controller connected to the CPU pool controls allocation of CPU resources, and schedules the CPU resources in order to cooperate with another CPU, memory, and I/O device to complete a task assigned by a system. There may be one or more CPU pools. FIG. 1 shows the CPU pool 101 and the CPU pool 102. CPUs in each CPU pool perform message communication using a shared controller. For CPUs in different CPU pools, mutual message communication (between the CPUs in the different CPU pools) needs to be implemented by means of message communication between the controllers according to their respective message communication capabilities. For example, a specific implementation of message communication between a CPU in the CPU pool 101 and a CPU in the CPU pool 102 is as follows. The CPU in the CPU pool 101 first sends a message to a controller of the CPU pool 101, the controller of the CPU pool 101 forwards the message to a controller of the CPU pool 102, and then the controller of the CPU pool 102 sends the message to the CPU in the CPU pool 102.

The controller connected to the I/O pool 104 controls allocation of I/O resources, and schedules the I/O resources. For example, the CPU in the CPU pool triggers a message carrying an I/O access request, and the message is sent by the controller connected to the CPU pool to the controller connected to the I/O pool 104. The controller connected to the I/O pool 104 allocates an I/O in the I/O pool 104 according to the I/O access request, and accesses an external device using the allocated I/O. For example, the controller connected to the I/O pool 104 sends an instruction to the external device. For another example, the controller connected to the I/O pool 104 obtains data from the external device. For another example, the controller connected to the I/O pool 104 may allocate an I/O according to a CPU request in the CPU pool, and based on message communication with the controller connected to the storage pool 103, output data stored in the storage pool 103 to the external device using the allocated I/O, and/or write data that is obtained using the allocated I/O and that is of the external device into a storage medium of the storage pool 103.

The controller connected to the storage pool 103 is used for management of storage resources, including allocation of the storage resources in the storage pool 103 and setting access permission for the allocated storage resources. In this embodiment, the controller of the storage pool 103 delimits, in the storage pool 103, a remote shared partition shared by multiple CPUs (including a CPU on which a mapper node runs and a CPU on which a reducer node runs) in the CPU pool. An implementation of accessing the remote shared partition by the CPU is as follows. The CPU sends a message carrying a partition access request to the controller of the CPU pool, and based on message communication between the controller connected to the storage pool 103 and the controller of the CPU pool, the controller of the storage pool 103 receives the message carrying the partition access request, and accesses the remote shared partition designated by the partition access request. It may be learned that the implementation of accessing the remote shared partition by the CPU is different from an implementation of accessing the local memory. The multiple CPUs in the CPU pool can access a same remote shared partition. However, the local memory can be accessed only by a local CPU connected to the local memory, and usually, the local CPU directly accesses the local memory using a memory bus.

The controller of the storage pool 103 may set permission for the multiple CPUs in the CPU pool to access the remote shared partition. The access permission that may be set is any one of the following read only permission, write only permission, read/write permission, or other permission. If the controller of the storage pool 103 sets the read only permission for the remote shared partition for a CPU, the CPU mounts the remote shared partition with the read only permission, and then can read data from the remote shared partition using the controller of the storage pool 103. If the controller of the storage pool 103 sets the write only permission for the remote shared partition for a CPU, the CPU mounts the remote shared partition with the write only permission, and then can write data into the remote shared partition using the controller of the storage pool 103. If the controller of the storage pool 103 sets the read/write permission for the remote shared partition for a CPU, the CPU mounts the remote shared partition with the read/write permission, and can not only read data from the remote shared partition using the controller of the storage pool 103, but can also write data into the remote shared partition using the controller of the storage pool 103. The mount herein means connecting the remote shared partition to an existing directory as a file, and accessing a file in the remote shared partition using the directory.

Further, in this embodiment of the present application, the remote shared partition delimited in the storage pool 103 is used for executing a Map/Reduce task. The mapper node and the reducer node run on different CPUs in the CPU pool, the mapper node uses the remote shared partition to store an execution result of the map task, and the reducer node can directly read the execution result of the map task from the remote shared partition, and executes the reduce task on the execution result of the map task, thereby omitting some actions in the other approaches, and shortening a time for executing the Map/Reduce task. The omitted actions include writing, by the mapper node, the execution result of the map task into a local disk using a disk I/O, when the reducer node requests the execution result, reading the execution result of the map task from the local disk using the disk I/O, and sending a TCP stream carrying the execution result to the reducer node using a network I/O. If the storage pool 103 is further a memory pool, in comparison with the other approaches, a speed of reading/writing data from/into the remote shared partition (belonging to the storage pool 103) by the mapper node and the reducer node is higher than a speed of reading/writing data from/into the local disk, thereby further shortening the time for executing the Map/Reduce task.

This embodiment of the present application is based on the architecture shown in FIG. 1. To execute the Map/Reduce task in the architecture, the following actions need to be performed first.

A first action: A CPU is determined in the CPU pool, and is used to run a process for implementing a master node. At least two CPUs are determined in the CPU pool, and are used to run a process for implementing multiple worker nodes.

A second action: The master node assigns a map task to an idle worker node, a worker node executing the map task becomes a mapper node, and the mapper node does not belong to an idle worker node. The master node assigns a reduce task to an idle worker node, a worker node executing the reduce task becomes a reducer node, and the reducer node does not belong to an idle worker node. It may be learned that the mapper node and the reducer node are different nodes.

In a scenario to which this embodiment is applicable, the mapper node and the reducer node run on different CPUs. Multiple mapper nodes may run on one or more CPUs. If the multiple mapper nodes run on a same CPU, the multiple mapper nodes run as threads, or if the multiple mapper nodes respectively run on different CPUs, the multiple mapper nodes run as processes. Similarly, multiple reducer nodes may run on one or more CPUs. If the multiple reducer nodes run on a same CPU, the multiple reducer nodes run as threads, or if the multiple reducer nodes respectively run on different CPUs, the multiple reducer nodes run as processes.

A third action: The master node applies for a shareable remote shared partition from the controller of the storage pool 103 by means of message communication. The controller of the storage pool 103 responds to the application, and delimits the remote shared partition. The controller of the storage pool 103 feeds back a partition name of the remote shared partition and permission to access the remote shared partition to the master node by means of message communication. The master node then notifies the mapper node of the partition name of the remote shared partition and access permission granted to the mapper node upon the application. The master node then notifies the reducer node of the partition name of the remote shared partition and access permission granted to the reducer node upon the application.

A fourth action: In this embodiment, the Map/Reduce task is executed on a dataset. Before the map task is executed, the dataset is divided into data slices. Optionally, a specific division rule may be determined according to a task requirement and/or execution efficiency. For example, the dataset is divided into the data slices according to one or more values in a range from 16 megabytes (MB) to 64 MB, which shall not be construed as any limitation to the present application herein. In this embodiment, a data slice is used as an input of a mapper node such that the mapper node executes the map task on the input data slice.

Based on the architecture shown in FIG. 1, Embodiment 1 and Embodiment 2 describe a method for executing a Map/Reduce task in the architecture, Embodiment 3 is an extension to Embodiment 1 and Embodiment 2, and describes from the perspective of a mapper node a data processing method provided in the architecture, Embodiment 4 is an extension to Embodiment 1 and Embodiment 2, and describes from the perspective of a reducer node a data processing method provided in the architecture, Embodiment 5 describes from the perspective of a mapper node a data processing apparatus corresponding to the method provided in Embodiment 3, Embodiment 6 describes from the perspective of a reducer node a data processing apparatus corresponding to the method provided in Embodiment 4, Embodiment 7 describes a computer device that can perform the data processing methods provided in Embodiment 3 and Embodiment 4, and Embodiment 8 describes a system built in the architecture.

Embodiment 1

Figure 2:
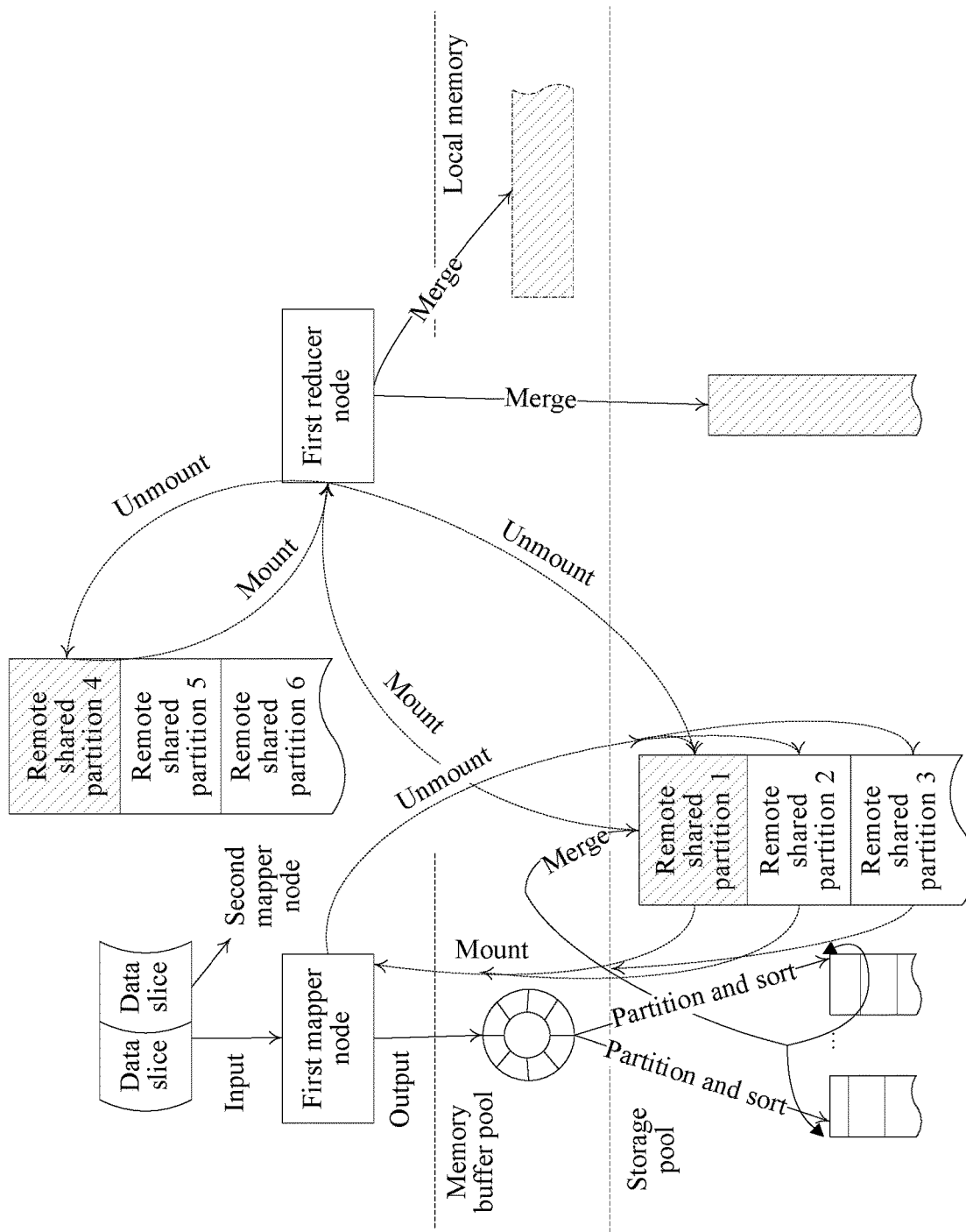
FIG. 2 is an example flowchart of executing a Map/Reduce task based on a remote shared partition.

With reference to FIG. 2, the following describes in detail a procedure of executing a Map/Reduce task when a remote shared partition is introduced.

For ease of description, an example in which a dataset is divided into two data slices (referring to FIG. 2) is used in this embodiment to describe the procedure of executing the Map/Reduce task. Therefore, dividing the dataset into two data slices is merely an example, and shall not be construed as any limitation to this embodiment. As shown in FIG. 2, one data slice is to be processed by a first mapper node, and the other data slice is to be processed by a second mapper node. In this embodiment, a master node assigns three reduce tasks, one reduce task is processed by one reducer node, and therefore there are three reducer nodes in total, including a first reducer node, a second reducer node, and a third reducer node. FIG. 2 shows the first reducer node, but does not show the second reducer node and the third reducer node.

It should be noted that after determining the two mapper nodes and the three reducer nodes, the master node notifies the two mapper nodes of identifiers of the three reducer nodes and key values respectively corresponding to the three reducer nodes.

Referring to FIG. 2, the master node applies for six remote shared partitions from a controller of a storage pool. Specific rules of allocating, by the master node, the six remote shared partitions to the two mapper nodes and the three reducer nodes are as follows.

Remote shared partitions shareable to the first mapper node include a remote shared partition 1, a remote shared partition 2, and a remote shared partition 3, and read/write permission for the three remote shared partitions is assigned to the first mapper node.

Remote shared partitions shareable to the second mapper node include a remote shared partition 4, a remote shared partition 5, and a remote shared partition 6, and read/write permission for the three remote shared partitions is assigned to the second mapper node.

Remote shared partitions shareable to the first reducer node include the remote shared partition 1 and the remote shared partition 4, and read permission for the remote shared partition 1 and the remote shared partition 4 is assigned to the first reducer node.

Remote shared partitions shareable to the second reducer node (not shown in FIG. 2) include the remote shared partition 2 and the remote shared partition 5, and read permission for the remote shared partition 2 and the remote shared partition 5 is assigned to the second reducer node.

Remote shared partitions shareable to the third reducer node (not shown in FIG. 2) include the remote shared partition 3 and the remote shared partition 6, and read permission for the remote shared partition 3 and the remote shared partition 6 is assigned to the third reducer node.

The following mainly explains, from perspectives of the first mapper node and the first reducer node, the specific procedure of executing the Map/Reduce task in this embodiment.

The first mapper node mounts the remote shared partition 1, the remote shared partition 2, and the remote shared partition 3 with the read/write access permission, and may implement mounting of the remote shared partitions using a mount instruction.

The first mapper node executes the map task on the input data slice. In a process of executing the map task, the first mapper node successively writes execution results that are obtained by executing the map task into a circular memory buffer in a memory buffer pool according to a time sequence, and then spills the execution results in the circular memory buffer into a local disk or a storage pool. FIG. 2 shows only a case of spilling the execution results into the storage pool. One spill file is obtained during each time of spilling. A specific spilling process is as follows. An execution result currently expected to be spilled from the circular memory buffer is partitioned according to a key value corresponding to the reduce task, and three (equal to a quantity of the reducer nodes) data segments are obtained by means of partitioning. Herein, a case in which the execution result obtained each time has a key value corresponding to each reducer node is used as an example. Certainly, if an execution result obtained during a time of spilling does not have a key value corresponding to a reducer node, no data segment corresponding to the reducer node is obtained by means of partitioning, and in this case, a quantity of data segments obtained by means of partitioning is less than 3. Then, the three data segments each are sorted according to the key value, and the three sorted data segments are spilled into the local disk or the storage pool in a form of a file. It may be learned that the spill file obtained during each time of spilling includes three sorted data segments.

After completing execution of the map task, the first mapper node reads spill files spilled at different time points from a local disk or a storage pool.

The first mapper node obtains, from each spill file, sorted data segments to be respectively processed by the three reducer nodes. Then, all sorted data segments having a key value corresponding to a single reducer node are sorted and merged to obtain a data segment to be processed by the single reducer node. By analogy, the first mapper node may separately sort and merge sorted data segments in all the spill files, to obtain data segments to be respectively processed by the three reducer nodes. For example, the first mapper node separately obtains, according to a key value corresponding to the first reducer node, a data segment to be processed by the first reducer node from the three sorted data segments included in each spill file, and sorts and merges, according to the key value corresponding to the first reducer node, the data segment obtained from each spill file to obtain a first data segment. The first data segment is a data segment to be processed by the first reducer node.

The first mapper node respectively stores the three data segments into the three remote shared partitions, that is, the remote shared partition 1, the remote shared partition 2, and the remote shared partition 3 in a form of files. Further, a file including the first data segment (to be processed by the first reducer node) is stored into the remote shared partition 1, a file including a data segment to be processed by the second reducer node is stored into the remote shared partition 2, and a file including a data segment to be processed by the third reducer node is stored into the remote shared partition 3. An example is used to describe a storage implementation principle. The three reducer nodes have their respective corresponding key values, and the remote shared partition 1, the remote shared partition 2, and the remote shared partition 3 are shared by the first reducer node, the second reducer node, and the third reducer node respectively. Therefore, the first mapper node can determine the respective remote shared partitions of the three data segments according to the respective key values of the three data segments.

When storing the data segment into the remote shared partition in a form of a file, the first mapper node sets a file name for the file, and stores a partition name of the remote shared partition and the file name. A storage location may be a local memory or the local disk in a computer device in which the first mapper node is located. Certainly, the storage location may also be another storage medium outside the computer device. Optionally, file names set for files in different remote shared partitions may be different, or may be the same. If the files in the different remote shared partitions have a same file name, reducer nodes respectively corresponding to two files with the same file name may be distinguished according to different partition names of the different remote shared partitions. After completing execution of the map task, the first mapper node sends a first message to the master node. The first message further carries address information of the first mapper node, the address information includes an address of the first mapper node and/or an identity of the first mapper node. The first message is used to notify the master node that a mapper node (the first mapper node) specified by the address information has completed execution of the map task assigned by the master node.

In addition, after completing execution of the map task, the first mapper node unmounts the remote shared partition 1, the remote shared partition 2, and the remote shared partition 3. Further, the first mapper node may unmount the three remote shared partitions using an unmount instruction. The unmount herein means deleting a corresponding partition device in the first mapper node, and is an action opposite to the mount.

The master node (not shown in FIG. 2) receives a first message, and determines, according to an address and/or an identity in the first message, that the first mapper node has completed execution of the assigned map task, and after determining that the first mapper node has completed execution of the assigned map task, the master node sends a second message carrying address information of the first mapper node to the first reducer node. Alternatively, the first reducer node may proactively send a query request to the master node every other specified time, and when receiving the first message triggered when the first mapper node has completed execution of the map task, the master node responds to a latest query request, and sends a second message carrying address information of the first mapper node to the first reducer node.

Similarly, after determining, according to the first message, that the first mapper node has completed execution of the assigned map task, the master node also separately sends a message carrying address information of the first mapper node to the second reducer node and the third reducer node.

The first reducer node receives the second message sent by the master node, and learns, according to the second message, that the first mapper node has completed execution of the assigned map task. After learning that the first mapper node has completed execution of the assigned map task, the first reducer node generates a data request message according to the address information of the first mapper node, and sends the data request message to the first mapper node, where the data request message carries an identifier of the first reducer node, and the identifier is used to distinguish the first reducer node from the other two reducer nodes. For example, the master node numbers the three reducer nodes in advance, and the identifier of the first reducer node may be a number that is set by the master node for the first reducer node.

Similarly, after learning, according to messages sent by the master node, that the first mapper node has completed execution of the assigned map task, the second reducer node and the third reducer node separately send data request messages to the first mapper node.

The first mapper node receives the data request message sent by the first reducer node. The first mapper node obtains the identifier of the first reducer node from the data request message, matches the obtained identifier with prestored identifiers of the three reducer nodes, and identifies, by means of matching, that the data request message is sent by the first reducer node. Then, the first mapper node responds to the data request message, and generates a response message according to the identifier of the first reducer node. The response message carries a partition name of the remote shared partition 1, and the response message further carries a file name of the file including the first data segment. The first mapper node sends the response message to the first reducer node.

Similarly, after receiving the data request messages sent by the second reducer node and the third reducer node, the first mapper node feeds back a partition name of the remote shared partition 2 and a file name of the file including the data segment to be processed by the second reducer node to the second reducer node, and feeds back a partition name of the remote shared partition 3 and a file name of the file including the data segment to be processed by the third reducer node to the third reducer node.

The first reducer node receives the response message sent by the first mapper node, and obtains the partition name of the remote shared partition 1 from the response message. The first reducer node mounts the remote shared partition 1 with the read only permission according to the partition name of the remote shared partition 1, for example, mounts the remote shared partition 1 using the mount instruction.

The first reducer node obtains the file name of the file including the first data segment from the response message. The first reducer node performs message communication with the controller of the storage pool, finds the file including the first data segment from the remote shared partition 1 according to the obtained file name (the file name carried in the response message) using the controller of the storage pool, and reads the first data segment from the file.

The first mapper node stores the data segments to be processed by the three reducer nodes into the remote shared partition 1, the remote shared partition 2, and the remote shared partition 3 respectively. Similarly, after completing execution of the map task, the second mapper node obtains, by means of merging, data segments to be respectively processed by the three reducer nodes, writes a data segment to be processed by the first reducer node into the remote shared partition 4 in a form of a file, writes a data segment to be processed by the second reducer node into the remote shared partition 5 in a form of a file, and writes a data segment to be processed by the third reducer node into the remote shared partition 6 in a form of a file.

The first reducer node mounts the remote shared partition 4, and reads the data segment to be processed by the first reducer node from the file in the remote shared partition 4. Then, the first reducer node executes the reduce task on the first data segment read from the remote shared partition 1 and the data segment read from the remote shared partition 4.

Subsequently, the first reducer node may merge execution results obtained by executing the reduce task and write a merged execution result into a local storage medium (for example, a disk), or may merge obtained execution results and write a merged execution result into the storage pool, or may certainly merge obtained execution results and write a merge execution result into another storage medium. This is not limited herein.

After completing reading the data segments from the remote shared partition 1 and the remote shared partition 4, the first reducer node unmounts the remote shared partition 1 and the remote shared partition 4. For example, the first reducer node may unmount the remote shared partition 1 and the remote shared partition 4 using the unmount instruction.

Similar to a working principle of the first reducer node, the second reducer node mounts the remote shared partition 2 according to the partition name, fed back by the first mapper node, of the remote shared partition 2, mounts the remote shared partition 5 according to the partition name, fed back by the second mapper node, of the remote shared partition 5, and reads the data segments to be processed by the second reducer node from the remote shared partition 2 and the remote shared partition 5 respectively. After completing reading the data segments, the second reducer node unmounts the remote shared partition 2 and the remote shared partition 5. The second reducer node executes the reduce task on the data segments respectively read from the remote shared partition 2 and the remote shared partition 5, merges execution results, and writes a merged execution result into a storage medium (for example, the local disk or the storage pool).

Similarly, the third reducer node mounts the remote shared partition 3 according to the partition name, fed back by the first mapper node, of the remote shared partition 3, mounts the remote shared partition 6 according to the partition name, fed back by the second mapper node, of the remote shared partition 6, and reads the data segments to be processed by the third reducer node from the remote shared partition 3 and the remote shared partition 6 respectively.

After completing reading the data segments, the third reducer node unmounts the remote shared partition 3 and the remote shared partition 6. The third reducer node executes the reduce task on the data segments respectively read from the remote shared partition 3 and the remote shared partition 6, merges execution results, and writes a merged execution result into a storage medium (for example, the local disk or the storage pool).

In this embodiment, a mapper node stores a data segment into a remote shared partition, and a reducer node can directly obtain, from the remote shared partition, a data segment to be processed by the reducer node. In this way, in the other approaches when the reducer node requests the data segment from the mapper node, first reading, by the mapper node, the data segment from a local disk, and then sending the read data segment to the reducer node using a TCP stream are omitted, thereby effectively shortening a time required for executing the Map/Reduce task. If the remote shared partition is delimited in a memory pool, in comparison with the other approaches, a speed of reading/writing data by accessing the remote shared partition by the mapper node and the reducer node is higher than a speed of reading/writing data from/into the local disk, thereby further shortening the time for executing the Map/Reduce task.

Embodiment 2

Figure 3:
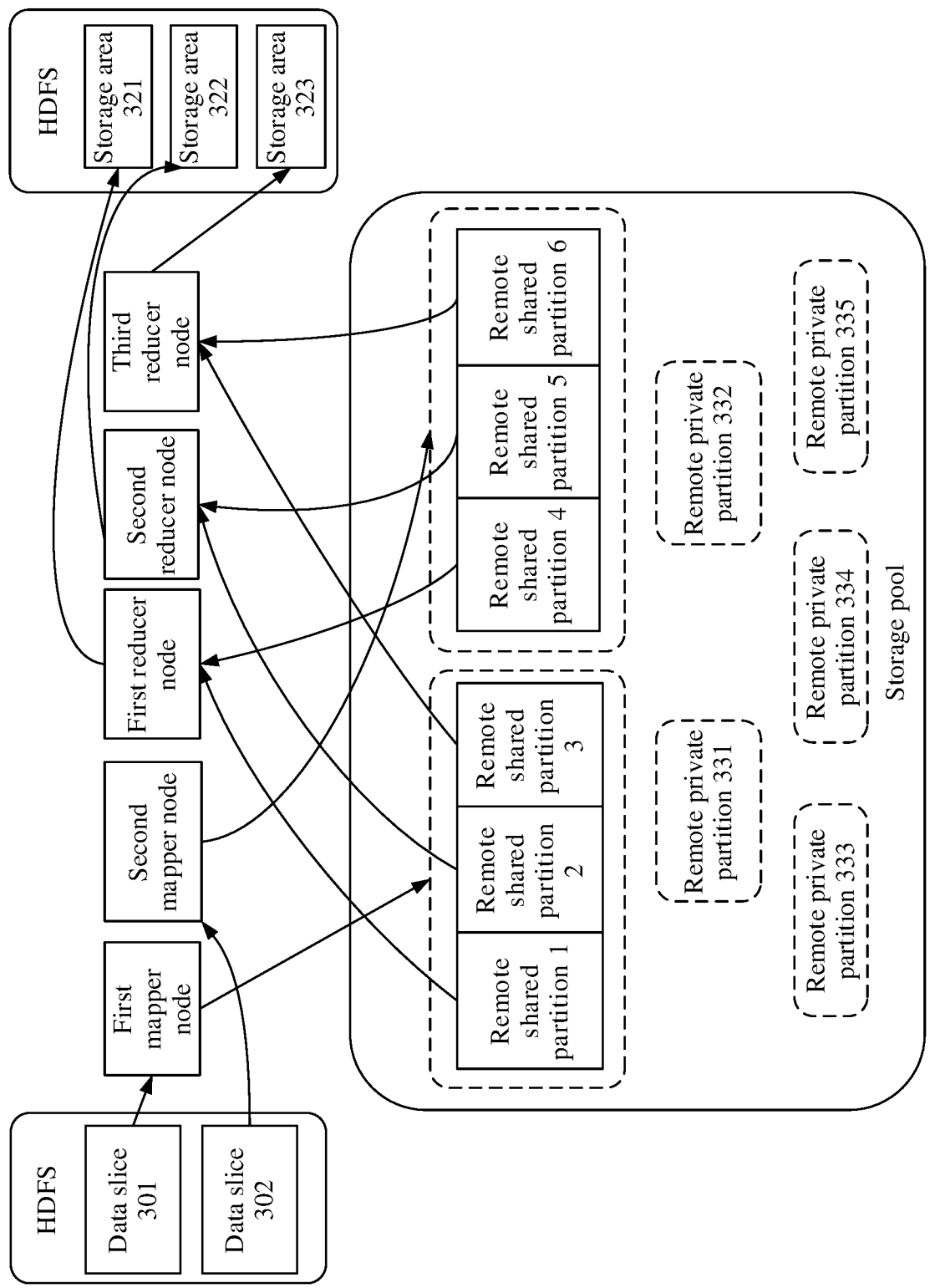
FIG. 3 is an example flowchart of executing a Map/Reduce task based on a remote shared partition and a remote private partition.

In this embodiment, datasets are stored and managed using a HADOOP distributed file system (HDFS). Therefore, in this embodiment, a dataset is divided into two data slices. FIG. 3 shows a data slice 301 and a data slice 302, which are also stored in the HDFS. It should be noted that, dividing the dataset into two data slices is merely an example, and the dataset may be divided into one or more data slices. Therefore, a quantity of the data slices shall not be construed as a limitation to this embodiment.

A master node (not shown in FIG. 3) determines two mapper nodes in idle worker nodes. FIG. 3 shows a first mapper node and a second mapper node. The first mapper node executes a map task on the data slice 301, and the second mapper node executes a map task on the data slice 302. In addition, the master node determines three reducer nodes in the idle worker nodes. FIG. 3 shows a first reducer node, a second reducer node, and a third reducer node. After determining the two mapper nodes and the three reducer nodes, the master node notifies the two mapper nodes of identifiers of the three reducer nodes and key values respectively corresponding to the three reducer nodes.

Similar to Embodiment 1, the master node applies for six remote shared partitions, including a remote shared partition 1, a remote shared partition 2, a remote shared partition 3, a remote shared partition 4, a remote shared partition 5, and a remote shared partition 6 from a controller of a storage pool. The controller of the storage pool sets the following shared permission for the six remote shared partitions. The remote shared partition 1 is shareable to the first mapper node and the first reducer node, the remote shared partition 2 is shareable to the first mapper node and the second reducer node, the remote shared partition 3 is shareable to the first mapper node and the third reducer node, the remote shared partition 4 is shareable to the second mapper node and the first reducer node, the remote shared partition 5 is shareable to the second mapper node and the second reducer node, and the remote shared partition 6 is shareable to the second mapper node and the third reducer node.

The master node further applies for a remote private partition for each mapper node and each reducer node from the controller of the storage pool, and assigns private permission to the first mapper node to access a remote private partition 331, assigns private permission to the second mapper node to access a remote private partition 332, assigns private permission to the first reducer node to access a remote private partition 333, assigns private permission to the second reducer node to access a remote private partition 334, and assigns private permission to the third reducer node to access a remote private partition 335. The remote private partition is exclusive, that is, non-shared. Only a node to which private permission is assigned can access the remote private partition. For example, if the private permission for the remote private partition 331 is assigned to the first mapper node, the first mapper node can access the remote private partition 331, but another mapper node or reducer node cannot access the remote private partition 331.

Implementation of a procedure of executing a Map/Reduce task in Embodiment 2 is similar to implementation of the procedure of executing the Map/Reduce task in Embodiment 1, except for the following three differences, including a first difference, a second difference, and a third difference.

The first difference: The first mapper node mounts the remote private partition 331. In a process of executing the map task on the data slice 301, the first mapper node temporarily stores an execution result of the map task into a buffer, and spills the execution result temporarily stored in the buffer into the remote private partition 331. One spill file is obtained during each time of spilling. After completing execution of the map task on the data slice 301, the first mapper node reads, from the remote private partition 331, spill files spilled at different time points, and merges data segments in all the read spill files, to obtain a first data segment to be processed by the first reducer node, a data segment to be processed by the second reducer node, and a data segment to be processed by the third reducer node. A principle of the implementation for implementing merging herein is the same as that of the implementation of obtaining the three data segments by the first mapper node by means of merging in Embodiment 1. For details of implementing merging, refer to the specific implementation of merging, by the first mapper node, the sorted data segments included in all the spill files into the data segments to be respectively processed by the three reducer nodes in Embodiment 1. Details are not repeatedly described herein. The first mapper node stores a file including the first data segment into the remote shared partition 1, stores a file including the data segment to be processed by the second reducer node into the remote shared partition 2, and stores a file including the data segment to be processed by the third reducer node into the remote shared partition 3.

Similarly, the second mapper node mounts the remote private partition 332. An implementation for storing, by the second mapper node, a spill file using the remote private partition 332, and reading the spill file from the remote private partition 332 is similar to that for the first mapper node. Details are not repeatedly described herein. In addition, the second mapper node stores a file including a data segment to be processed by the first reducer node into the remote shared partition 4, stores a file including a data segment to be processed by the second reducer node into the remote shared partition 5, and stores a file including a data segment to be processed by the third reducer node into the remote shared partition 6.

For a dataset of a big data application, the dataset has a very large data volume, and correspondingly, larger storage space is needed to store the spill file obtained by executing the map task. In this case, storage space of a local disk is limited, but the storage pool has sufficient storage space, and the remote private partition delimited in the storage pool may be used to store the spill file. Because the remote private partition is exclusive, it is ensured that the spill file is free from unauthorized modification, and security of the spill file is ensured. If the remote private partition is delimited in a memory pool, in comparison with the other approaches, a speed of reading/writing data by accessing the private shared partition by the mapper node and the reducer node is higher than a speed of reading/writing data by accessing the local disk, thereby further shortening a time for executing the Map/Reduce task.

The second difference: The first reducer node mounts the remote private partition 333. The first reducer node mounts the remote shared partition 1 and the remote shared partition 4, and separately reads the data segments to be processed by the first reducer node from the remote shared partition 1 and the remote shared partition 4. The first reducer node first uses a local memory to store the data segments read from the remote shared partition 1 and the remote shared partition 4, and if the local memory is insufficient, stores remaining data segments (including data segments subsequently read from the remote shared partition 1 and the remote shared partition 4) into the remote private partition 333. Optionally, without using the local memory for storing, the remote private partition 333 may be used from the beginning to store the data segments read from the remote shared partition 1 and the remote shared partition 4.

Similarly, the second reducer node mounts the remote private partition 334. The second reducer node mounts the remote shared partition 2 and the remote shared partition 5, and separately reads the data segments to be processed by the second reducer node from the remote shared partition 2 and the remote shared partition 5. The second reducer node still first uses the local memory to store the data segments read from the remote shared partition 2 and the remote shared partition 5, and if the local memory is insufficient, stores remaining data segments (including data segments subsequently read from the remote shared partition 2 and the remote shared partition 5) into the remote private partition 334 of the second reducer node. Optionally, without using the local memory for storing, the remote private partition 334 may be used from the beginning to store the data segments read from the remote shared partition 2 and the remote shared partition 5.

Similarly, the third reducer node mounts the remote private partition 335. The third reducer node mounts the remote shared partition 3 and the remote shared partition 6, and separately reads the data segments to be processed by the third reducer node from the remote shared partition 3 and the remote shared partition 6. The third reducer node still first uses the local memory to store the data segments read from the remote shared partition 3 and the remote shared partition 6, and if the local memory is insufficient, stores remaining data segments (including data segments subsequently read from the remote shared partition 3 and the remote shared partition 6) into the remote private partition 335 of the third reducer node. Optionally, without using the local memory for storing, the remote private partition 335 may be used from the beginning to store the data segments read from the remote shared partition 2 and the remote shared partition 5.

In this embodiment, the remote private partition is used to store a data segment such that a data volume of the data segment that can be processed by the reducer node can be increased. Because the remote private partition is exclusive, unauthorized modification of the data segment can be avoided. If the remote private partition is delimited in a memory pool, in comparison with the other approaches, a speed of reading/writing data by accessing the private shared partition by the mapper node and the reducer node is higher than a speed of reading/writing data by accessing the local disk, thereby further shortening a time for executing the Map/Reduce task.

The third difference: The first reducer node stores an execution result obtained by executing the reduce task on the data segment into a storage area 321 in the HDFS in a form of a file, and the storage area 321 is storage space in the HDFS. The second reducer node stores an execution result obtained by executing the reduce task on the data segment into a storage area 322 in the HDFS in a form of a file, and the storage area 322 is storage space in the HDFS. The third reducer node stores an execution result obtained by executing the reduce task on the data segment into a storage area 323 in the HDFS in a form of a file, and the storage area 323 is storage space in the HDFS.

Optionally, in an alternative implementation of the private storage partition 331 in Embodiment 2, the remote shared partition 1 may be used to replace the remote private partition 331 to store the spill file spilled by the first mapper node. In this case, after completing execution of the map task, the first mapper node obtains all the spill files from the remote shared partition 1. In an alternative implementation of the private storage partition 332 in Embodiment 2, the remote shared partition 2 may be used to replace the remote private partition 332 to store the spill file spilled by the first mapper node. In this case, after completing execution of the map task, the first mapper node obtains all the spill files from the remote shared partition 2.

Certainly, other storage space in the storage pool may also be used as an alternative to implement functions of the remote private partition in Embodiment 2.

Optionally, after completing reading the data segment from the remote shared partition, the reducer node instructs the controller of the storage pool to reclaim the remote shared partition, and the controller of the storage pool reclaims the remote shared partition, and subsequently may allocate the remote shared partition to another task node (for example, another mapper node for executing a Map/Reduce task) for use, thereby improving utilization of the remote shared partition. Similarly, after completing reading the spill file from the remote private partition, the mapper node instructs the controller of the storage pool to reclaim the remote private partition, and the controller of the storage pool reclaims the remote private partition, and subsequently may allocate the remote private partition to another task node (for example, another mapper node for executing a Map/Reduce task) for use, thereby improving utilization of the remote private partition. Similarly, after completing reading the data segment from the remote private partition, the reducer node instructs the controller of the storage pool to reclaim the remote private partition, and the controller of the storage pool reclaims the remote private partition, and subsequently may allocate the remote private partition to another task node (for example, another mapper node for executing a Map/Reduce task) for use, thereby improving utilization of the remote private partition.

Optionally, an optional detailed description of the spilling process in Embodiment 1 and/or Embodiment 2 is provided, and the detailed description is as follows.

In a process of executing the map task, the mapper node temporarily stores the execution result of the map task into a circular memory buffer according to a time sequence, and when usage of the circular memory buffer reaches 80%, triggers one time of spilling of the execution result that is of the map task and that is temporarily stored in the circular memory buffer. For a spilling process, refer to the corresponding descriptions in Embodiment 1 and Embodiment 2. Details are not repeatedly described herein. In the spilling process, because the circular memory buffer is still 20% unused, the mapper node may continue to write the execution result of the map task into the unused buffer, and the mapper node may not stop outputting the execution result of the map task, thereby achieving a purpose of not stopping executing the map task. After spilling is completed, the buffer that is originally used to buffer the execution result of the map task can be used to buffer the execution result of the map task again.

It should be noted that, a storage capacity of the storage pool is variable and usually has massive memory space, and it is impractical to manage the storage pool using a single file system. Therefore, in this embodiment of the present application, partitions, including the remote shared partition and the remote private partition, are delimited in the storage pool according to needs by the controller of the storage pool. A file system is separately set for each partition, and a name is given to each partition such that each partition has a distinctive partition name. The partition can be mounted/unmounted like another storage medium, for example, in the same way as mounting a hardware device in a Linux system and mapping the hardware device into a file in the system. In this embodiment of the present application, the partition in the storage pool can be directly mounted according to the partition name to access a file in the partition, and access permission may be set using a parameter during mounting.

Optionally, if the mapper node runs on a decoupled CPU in a CPU pool, but the reducer node does not run on the decoupled CPU in the CPU pool, the mapper node still stores the data segment into the remote shared partition, then, the reducer node communicates with the mapper node, to establish a TCP stream, and then the mapper node reads the data segment to be processed by the reducer node from the remote shared partition, and sends the read data segment to the reducer node using the TCP stream. Therefore, the implementation of the Map/Reduce task provided in this embodiment may be compatible with an implementation of executing a Map/Reduce task in the other approaches, except that the data segments are stored in different locations. If the remote shared partition is delimited in a memory pool, a speed of reading the data segment by accessing the remote shared partition in this embodiment of the present application is higher than a speed of reading the data segment by accessing the local disk in the other approaches such that an execution time of the Map/Reduce task can be reduced.

Embodiment 3

As a corresponding extension to the foregoing two embodiments, Embodiment 3 provides a basic working procedure of a data processing method from the perspective of a mapper node. For a system architecture of a system to which the basic working procedure is applicable, refer to the system architecture shown in FIG. 1, and for a detailed description of the system architecture, refer to the foregoing corresponding description of the system architecture shown in FIG. 1. The system includes a CPU pool and a storage pool, and the CPU pool is communicatively connected to the storage pool.

The CPU pool includes at least two CPUs, and at least one mapper node and at least one reducer node run in the CPU pool. It may be learned that there being two mapper nodes in Embodiment 1 and Embodiment 2 is merely an example, and there being three reducer nodes in Embodiment 1 and Embodiment 2 is also merely an example. The at least one mapper node includes a first mapper node, and the first mapper node is any mapper node in the at least one mapper node. The at least one reducer node includes a first reducer node, and the first reducer node is any reducer node in the at least one reducer node. The first mapper node and the first reducer node run on different CPUs in the CPU pool, and message communication between the first mapper node and the first reducer node is implemented by forwarding a message (for example, a data request message) by a controller of the CPU pool.

A remote shared partition included in the storage pool is shared by the first mapper node and the first reducer node. Optionally, the storage pool is a memory pool. Further, the master node applies for the remote shared partition and access permission for the remote shared partition for the first mapper node and the first reducer node from a controller of the storage pool, and allocates the remote shared partition to the first mapper node and the first reducer node. For an allocation implementation, refer to the related descriptions of allocation of the remote shared partition in Embodiment 1 and Embodiment 2. The remote shared partition herein may be shareable to all mapper nodes in the at least one mapper node and all reducers in the at least one reducer node, or may certainly be shareable only to the first mapper node and the first reducer node, but is shareable at least to the first mapper node and the first reducer node. In this embodiment, both the first mapper node and the first reducer node access the remote shared partition in a mounting manner.

Figure 4:
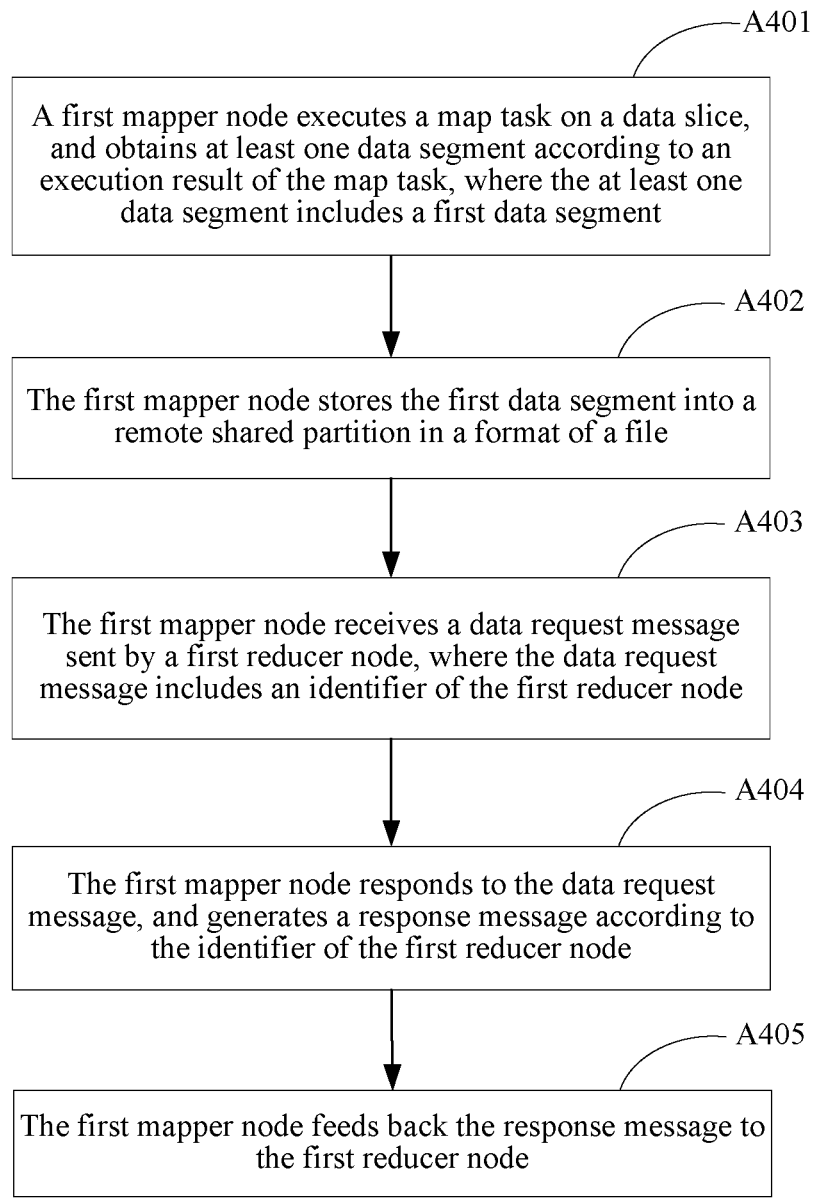
FIG. 4 is a basic flowchart of a data processing method described from the perspective of a mapper node.

The basic working procedure shown in FIG. 4 is provided from the perspective of the first mapper node, and the basic working procedure provided in FIG. 4 includes step A401, step A402, step A403, step A404, and step A405.

First, a dataset is divided into one or more data slices. For a specific division manner, refer to the foregoing related description of the fourth action (which is the fourth action of executing a Map/Reduce task in this architecture). The data slices may be different or may be the same in size. One data slice is used as an input of one mapper node, and one mapper node executes a map task on one data slice.

Step A401: The first mapper node executes a map task (that is, the map task described in Embodiment 1 and Embodiment 2) on a data slice, and obtains at least one data segment according to an execution result of the map task, where each of the at least one data segment is to be processed by a corresponding reducer node, the at least one data segment includes a first data segment, and the first data segment is a data segment to be processed by the first reducer node.

Step A402: The first mapper node stores the first data segment into the remote shared partition in a format of a file. Further, the first mapper node creates a new file in the remote shared partition, and writes the first data segment to the file.

Step A403: The first mapper node receives a data request message sent by the first reducer node, where the data request message includes an identifier of the first reducer node.

Step A404: The first mapper node responds to the data request message, and generates a response message according to the identifier of the first reducer node, where the response message includes a partition name of the remote shared partition that stores the first data segment and a file name of the file including the first data segment. If the remote shared partition is shareable to multiple mapper nodes in the at least one mapper node and/or is shareable to multiple reducer nodes in the at least one reducer node, file names of files that are stored in the remote shared partition and that include data segments are different such that the files including the data segments are distinguished using the file names.

Step A405: The first mapper node feeds back the response message to the first reducer node such that the first reducer node obtains, according to the response information, the first data segment from the file with the file name in the remote shared partition with the partition name, and executes a reduce task (that is, the reduce task described in Embodiment 1 and Embodiment 2) on the first data segment.

For implementation details of performing step A401, step A402, step A403, step A404, and step A405 by the first mapper node, refer to the corresponding description of performing related steps by the first mapper node in Embodiment 1 and Embodiment 2.

Figure 5:
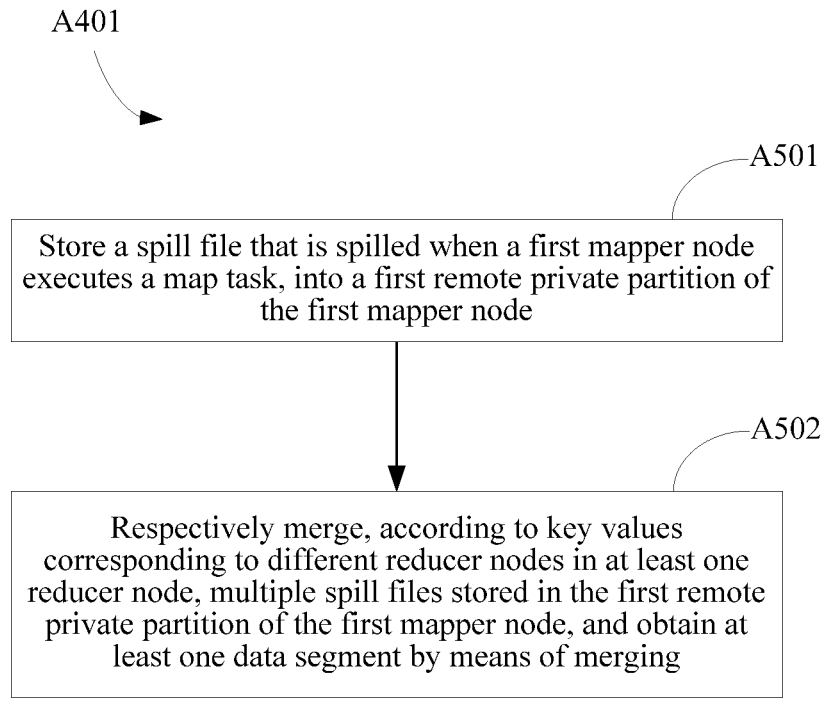
FIG. 5 is an optional detailed flowchart of step A401 in FIG. 4.

Optionally, non-shared storage space is separately allocated to the mapper nodes in the storage pool, and it is defined herein that private storage space of the mapper nodes is a first remote private partition. Therefore, each mapper node has an exclusive first remote private partition, and it may be learned that the storage pool includes the first remote private partition exclusive to the first mapper node. With reference to the first remote private partition of the first mapper node, the following provides an optional detailed description of step A401 from the perspective of how to obtain the first data segment. Referring to FIG. 5, the obtaining, by the first mapper node, at least one data segment according to an execution result of the map task further includes step A501 and step A502.

Step A501: Store a spill file that is spilled when the first mapper node executes the map task, into the first remote private partition of the first mapper node, where a single spill file includes data that is spilled once from a buffer in a process in which the first mapper node executes the map task, and the buffer temporarily stores the execution result of the map task.

Step A502: Respectively merge, according to key values corresponding to different reducer nodes in the at least one reducer node, multiple spill files stored in the first remote private partition of the first mapper node, and obtain the at least one data segment by means of merging.

For implementation details of performing step A501 and step A502 by the first mapper node, refer to the corresponding description of the storing, by the first mapper node, the spill file using the remote private partition 331 in Embodiment 2.

Optionally, using the remote shared partition to store the spill file is an alternative of using the first remote private partition to store the spill file. An implementation of using the remote shared partition to store the spill file is similar to an implementation of using the first remote private partition to store the spill file, and details are not repeatedly described herein.

Optionally, a quantity of remote shared partitions is equal to a product of a quantity of mapper nodes and a quantity of reducer nodes, and each remote shared partition is shared by one mapper node and one reducer node. For example, the six remote shared partitions, including the remote shared partition 1, the remote shared partition 2, the remote shared partition 3, the remote shared partition 4, the remote shared partition 5, and the remote shared partition 6 are shown in each of Embodiment 1 and Embodiment 2. The remote shared partition 1 is shared by the first mapper node and the first reducer node, the remote shared partition 2 is shared by the first mapper node and the second reducer node, the remote shared partition 3 is shared by the first mapper node and the third reducer node, the remote shared partition 4 is shared by the second mapper node and the first reducer node, the remote shared partition 5 is shared by the second mapper node and the second reducer node, and the remote shared partition 6 is shared by the second mapper node and the third reducer node.

Based on the remote shared partition herein, an optional detailed description of step A402 is provided in terms of how to store the data segment in the corresponding remote shared partition, and the storing, by the first mapper node, the data segment into the remote shared partition in a format of a file includes storing, by the first mapper node, the file including the first data segment into the remote shared partition shared by the first mapper node and the first reducer node.

For specific implementation details of storing, by the first mapper node, the file including the first data segment into the remote shared partition shared by the first mapper node and the first reducer node, refer to the implementation details of storing, by the first mapper node, the file including the first data segment into the remote shared partition 1 in Embodiment 1 and Embodiment 2. Because one remote shared partition stores one file including a data segment, file names of different files may be the same or may be different.

Embodiment 4

As a corresponding extension to the Embodiment 1 and Embodiment 2, Embodiment 4 provides a basic working procedure of a data processing method from the perspective of a reducer node. A system to which the basic working procedure is applicable is the same as the system to which the basic working procedure of the data processing method provided from the perspective of the mapper node in Embodiment 3 is applicable, and details are not repeatedly described herein.

Figure 6:
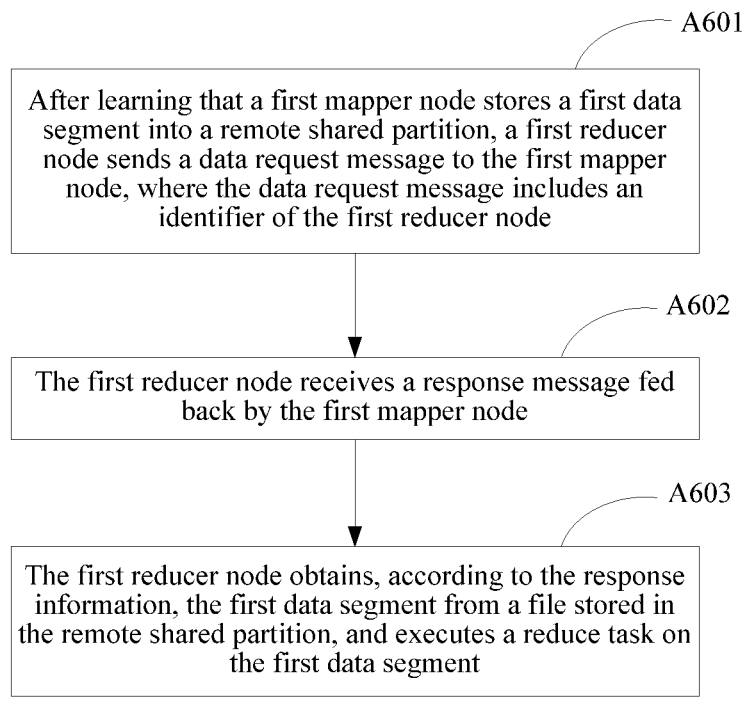
FIG. 6 is a basic flowchart of a data processing method described from the perspective of a reducer node.

The basic working procedure shown in FIG. 6 is provided from the perspective of a first reducer node, and the basic working procedure provided in FIG. 6 includes step A601, step A602, and step A603.

Step A601: After learning that the first mapper node stores a first data segment into the remote shared partition, the first reducer node sends a data request message to the first mapper node, where the data request message includes an identifier of the first reducer node, and the first data segment is a data segment that is to be processed by the first reducer node and that is in at least one data segment obtained by the first mapper node according to an execution result obtained after the first mapper node executes a map task.

Step A602: The first reducer node receives a response message fed back by the first mapper node, where the response message includes a partition name of the remote shared partition that stores the first data segment and a file name of a file including the first data segment, and the response message is generated by the first mapper node according to the identifier of the first reducer node when the first mapper node responds to the data request message.

Step A603: The first reducer node obtains, according to the response information, the first data segment from the file stored in the remote shared partition, and executes a reduce task on the first data segment (that is, the reduce task described in Embodiment 1 and Embodiment 2).

For implementation details of performing step A601, step A602, and step A603 by the first reducer node, refer to the corresponding descriptions of performing related steps by the first reducer node in Embodiment 1, Embodiment 2, and Embodiment 3.

Optionally, a quantity of remote shared partitions is equal to a product of a quantity of mapper nodes and a quantity of reducer nodes, and each remote shared partition is shared by one mapper node and one reducer node. For example, the six remote shared partitions, including the remote shared partition 1, the remote shared partition 2, the remote shared partition 3, the remote shared partition 4, the remote shared partition 5, and the remote shared partition 6 are shown in each of Embodiment 1 and Embodiment 2. The remote shared partition 1 is shared by the first mapper node and the first reducer node, the remote shared partition 2 is shared by the first mapper node and the second reducer node, the remote shared partition 3 is shared by the first mapper node and the third reducer node, the remote shared partition 4 is shared by the second mapper node and the first reducer node, the remote shared partition 5 is shared by the second mapper node and the second reducer node, and the remote shared partition 6 is shared by the second mapper node and the third reducer node.

Figure 7:
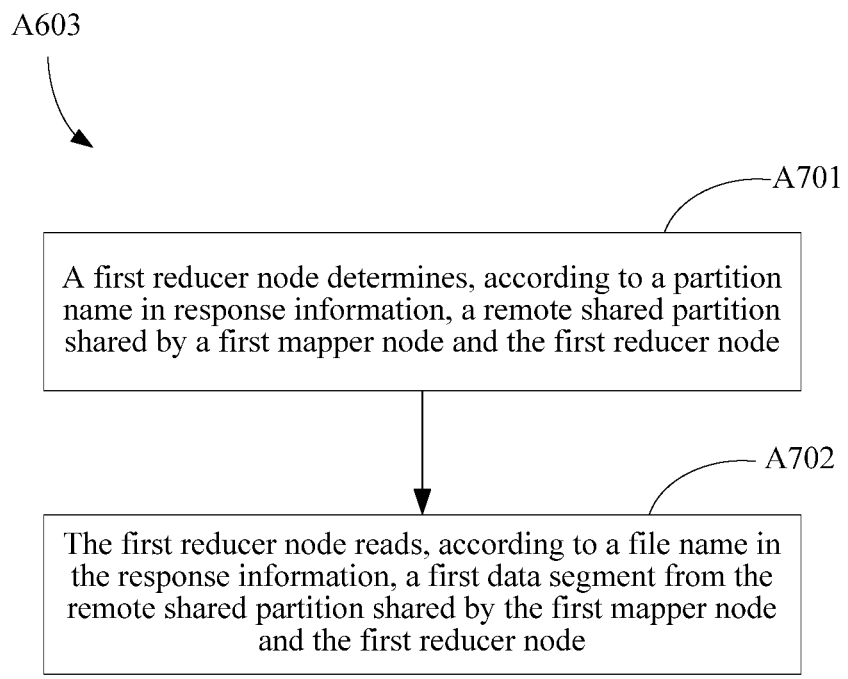
FIG. 7 is an optional detailed flowchart of step A603 in FIG. 6.

Based on the remote shared partition herein, referring to FIG. 7, the step A603 of obtaining, by the first reducer node according to the response information, the first data segment from the file stored in the remote shared partition includes step A701 and step A702.

Step A701: The first reducer node determines, according to the partition name in the response information, the remote shared partition shared by the first mapper node and the first reducer node.

Step A702: The first reducer node reads, according to the file name in the response information, the first data segment from the remote shared partition shared by the first mapper node and the first reducer node.

For implementation details of performing step A701 and step A702 by the first reducer node, refer to the corresponding descriptions of reading, by the first reducer node according to the response information, the first data segment from the remote shared partition shared by the first mapper node and the first reducer node in Embodiment 1 and Embodiment 2.

Optionally, non-shared storage space is separately allocated to the reducer nodes in the storage pool, and it is defined herein that private storage space of the reducer nodes is a second remote private partition. Therefore, each reducer node has an exclusive second remote private partition, and it may be learned that the storage pool includes the second remote private partition exclusive to the first reducer node. Based on storing a data segment using the second remote private partition, the method includes in a process of storing the first data segment read from the remote shared partition into a local memory, when usage of the local memory reaches preset usage, storing, by the first reducer node, the first data segment subsequently read from the remote shared partition into the second remote private partition of the first reducer node.

Optionally, the first reducer node accesses the remote shared partition in a mounting manner. Optionally, the storage pool is a memory pool.

The method procedure provided in Embodiment 4 from the perspective of the first reducer node corresponds to the method procedure provided in Embodiment 3 from the perspective of the first mapper node, and details are not repeatedly described herein. For a detailed description, refer to Embodiment 1, Embodiment 2, and Embodiment 3.

Embodiment 5

A data processing apparatus provided in Embodiment 5 includes apparatus units capable of implementing the method procedure provided in Embodiment 3. For brevity, no specific description is made herein to actions performed by functional units provided in Embodiment 5, and reference may be directly made to the corresponding action descriptions provided in the method procedures provided in Embodiment 1, Embodiment 2, and Embodiment 3.

Figure 8:
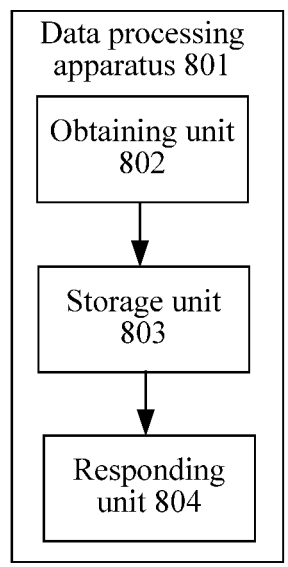
FIG. 8 is a schematic diagram of a logical structure of a data processing apparatus that can be used as a mapper node.

Referring to FIG. 8, a system to which the data processing apparatus 801 provided in this embodiment is applicable includes a CPU pool and a storage pool, and the CPU pool is communicatively connected to the storage pool. The CPU pool includes at least two CPUs, at least one mapper node and at least one reducer node run in the CPU pool, the at least one mapper node includes a first mapper node, the at least one reducer node includes a first reducer node, and the first mapper node and the first reducer node run on different CPUs in the CPU pool. A remote shared partition included in the storage pool is shared by the first mapper node and the first reducer node. The data processing apparatus 801 is used as the first mapper node, and the data processing apparatus 801 includes an obtaining unit 802 configured to execute a map task on a data slice, and obtain at least one data segment according to an execution result of the map task, where each of the at least one data segment is to be processed by a corresponding reducer node, the at least one data segment includes a first data segment, and the first data segment is a data segment to be processed by the first reducer node, a storage unit 803 configured to store the first data segment into the remote shared partition in a format of a file, and a responding unit 804 configured to receive a data request message sent by the first reducer node, where the data request message includes an identifier of the first reducer node, respond to the data request message and generate a response message according to the identifier of the first reducer node, where the response message includes a partition name of the remote shared partition that stores the first data segment and a file name of the file including the first data segment, and feedback the response message to the first reducer node.

Optionally, the storage pool includes a first remote private partition exclusive to the first mapper node, and when obtaining the at least one data segment according to an execution result of the map task the obtaining unit 802 is configured to store a spill file that is spilled when the first mapper node executes the map task, into the first remote private partition of the first mapper node, where a single spill file includes data that is spilled once from a buffer in a process in which the first mapper node executes the map task, and the buffer temporarily stores the execution result of the map task, and the obtaining unit 802 is configured to respectively merge, according to key values corresponding to different reducer nodes in the at least one reducer node, multiple spill files stored in the first remote private partition of the first mapper node, and obtain the at least one data segment by means of merging.

Optionally, a quantity of remote shared partitions is equal to a product of a quantity of mapper nodes and a quantity of reducer nodes, and each remote shared partition is shared by one mapper node and one reducer node, and when storing the data segment into the remote shared partition in a format of a file, the storage unit 803 is configured to store the file including the first data segment into the remote shared partition shared by the first mapper node and the first reducer node.

Optionally, the first mapper node accesses the remote shared partition in a mounting manner.

Optionally, the storage pool is a memory pool.

Embodiment 6

A data processing apparatus provided in Embodiment 6 includes apparatus units capable of implementing the method procedure provided in Embodiment 4. For brevity, no specific description is made herein to actions performed by functional units provided in Embodiment 5, and reference may be directly made to the corresponding action descriptions provided in the method procedures provided in Embodiment 1, Embodiment 2, Embodiment 3, and Embodiment 4.

Figure 9:
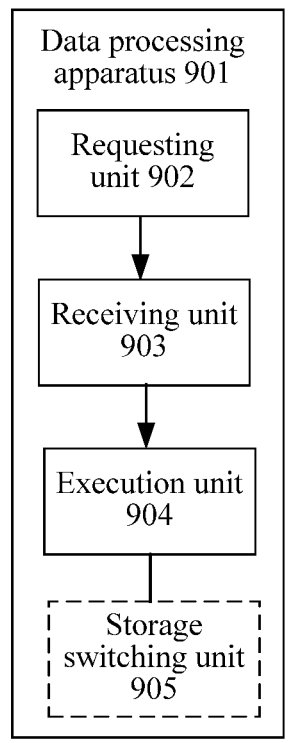
FIG. 9 is a schematic diagram of a logical structure of a data processing apparatus that can be used as a reducer node.

Referring to FIG. 9, a system to which the data processing apparatus 901 provided in this embodiment is applicable includes a CPU pool and a storage pool, and the CPU pool is communicatively connected to the storage pool. The CPU pool includes at least two CPUs, at least one mapper node and at least one reducer node run in the CPU pool, the at least one mapper node includes a first mapper node, the at least one reducer node includes a first reducer node, and the first mapper node and the first reducer node run on different CPUs in the CPU pool. A remote shared partition included in the storage pool is shared by the first mapper node and the first reducer node. The data processing apparatus 901 is used as the first reducer node, and the data processing apparatus 901 includes a requesting unit 902 configured to send a data request message to the first mapper node after learning that the first mapper node stores a first data segment into the remote shared partition, where the data request message includes an identifier of the first reducer node, and the first data segment is a data segment that is to be processed by the first reducer node and that is in at least one data segment obtained by the first mapper node according to an execution result obtained after the first mapper node executes a map task, a receiving unit 903 configured to receive a response message fed back by the first mapper node, where the response message includes a partition name of the remote shared partition that stores the first data segment and a file name of a file including the first data segment, and the response message is generated by the first mapper node according to the identifier of the first reducer node when the first mapper node responds to the data request message, and an execution unit 904 configured to obtain, according to the response information, the first data segment from the file stored in the remote shared partition, and execute a reduce task on the first data segment.

Optionally, a quantity of remote shared partitions is equal to a product of a quantity of mapper nodes and a quantity of reducer nodes, and each remote shared partition is shared by one mapper node and one reducer node, and when obtaining, according to the response information, the first data segment from the file stored in the remote shared partition, the execution unit 904 is configured to determine, according to the partition name in the response information, the remote shared partition shared by the first mapper node and the first reducer node, and the execution unit 904 is configured to read, according to the file name in the response information, the first data segment from the remote shared partition shared by the first mapper node and the first reducer node.

Optionally, the storage pool includes a second remote private partition exclusive to the first reducer node, and the reducer node includes a storage switching unit 905 configured to store the first data segment subsequently read from the remote shared partition into the second remote private partition of the first reducer node in a process of storing the first data segment read from the remote shared partition into a local memory, when usage of the local memory reaches preset usage.

Optionally, the first reducer node accesses the remote shared partition in a mounting manner.

Optionally, the storage pool is a memory pool.

Embodiment 7

Figure 10:
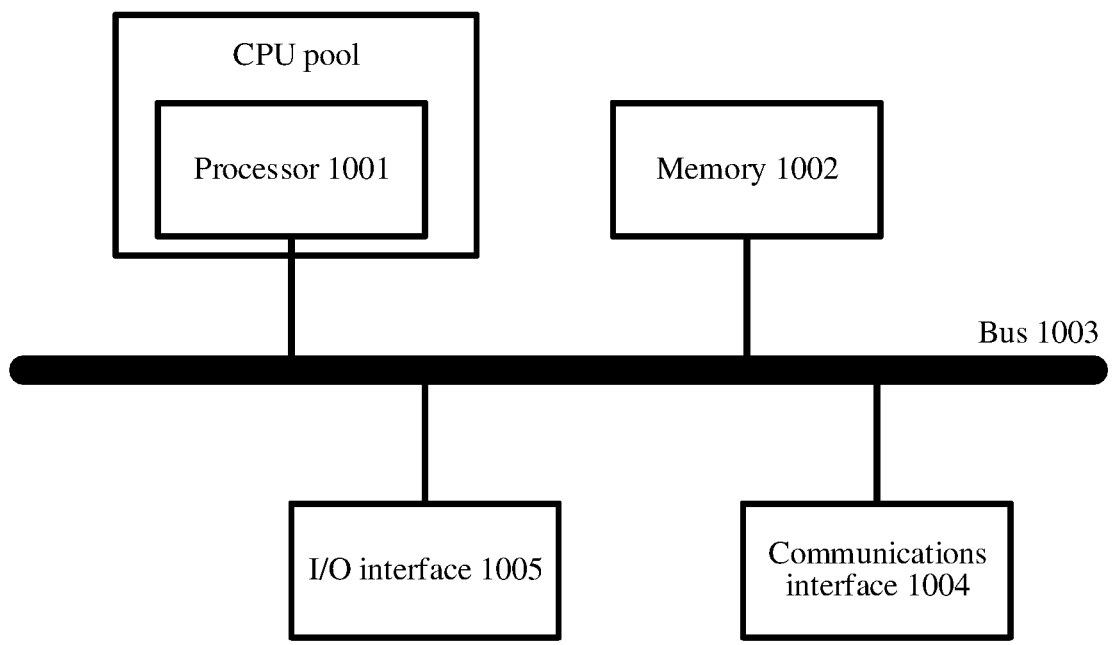
FIG. 10 is a schematic diagram of a hardware architecture of a computer device.

Embodiment 7 provides a hardware device for performing steps in the method provided in Embodiment 3 and/or Embodiment 4. Referring to FIG. 10, the hardware device is a computer device 1000. The computer device 1000 shown in FIG. 10 is the foregoing decoupled computer device in this embodiment of the present application, and the computer device 1000 includes a processor 1001 and a memory 1002, where the processor 1001 and the memory 1002 are connected using a bus 1003.

The memory 1002 is configured to store a computer instruction, and when the computer device 1000 runs, the processor 1001 executes the computer instruction stored in the memory 1002 to enable the computer device 1000 to perform the data processing method provided in Embodiment 3 and/or Embodiment 4. For specific implementations of the steps in the data processing method, refer to the corresponding descriptions of the steps in Embodiment 1, Embodiment 2, Embodiment 3, and Embodiment 4. Details are not repeatedly described herein.

The processor 1001 may be a general-purpose CPU, a microprocessor, an application-specific integrated circuit (ASIC), or one or more integrated circuits, and is used to execute related programs to implement the technical solutions provided in the foregoing method embodiments. Certainly, the processor 1001 may be a CPU in a CPU pool.

The memory 1002 may be a ROM, a static storage device, a dynamic storage device, or a RAM. The memory 1002 stores program code for implementing the technical solutions provided in the foregoing method embodiments, and may further store an operating system program. When the technical solutions provided in the foregoing method embodiments are implemented by software or firmware, the program code is executed by the processor 1001. The memory 1002 may be a storage medium in a storage pool, or may be a local storage medium, for example, a local disk.

The bus 1003 may include a channel to transmit information between components (for example, the processor 1001, the memory 1002, an I/O interface 1005, and a communications interface 1004).

The I/O interface 1005 is configured to receive data such as input data and information and an output operation result.

The communications interface 1004 uses a transceiver apparatus such as but not limited to a transceiver to implement network communication between the processor 1001 and another device or communications network. Optionally, the communications interface 1004 may be any of various interfaces for accessing a network, for example, an Ethernet interface for accessing Ethernet. The Ethernet interface includes but is not limited to an RJ-45 interface, an RJ-11 interface, an SC fiber interface, a fiber distributed data interface (FDDI), an attachment unit interface (AUI), a BNC interface, and a Console interface.

The I/O interface 1005 and the communications interface 1004 may be local, or may be in the I/O pool 104 in FIG. 1.

It should be noted that the foregoing method embodiments may be implemented using the processor 1001, the memory 1002, and the bus 1003. However, when the foregoing method embodiments are implemented in different application scenarios, persons skilled in the art should understand that other components such as the communications interface 1004 and the I/O interface 1005 that are necessary and suitable for implementing the foregoing method embodiments in the application scenarios may further be needed.

Embodiment 8

Embodiment 8 provides a system, which is a system to which the data processing methods provided in Embodiment 3 and Embodiment 4 are applicable. Reference may be made to the detailed descriptions of the system in Embodiment 3 and Embodiment 4, and details are not repeatedly described herein.

A first mapper node herein and the first mapper node provided in the foregoing method embodiments (Embodiment 1, Embodiment 2, Embodiment 3, and Embodiment 4) have same functions, and perform actions according to a same principle. A first reducer node herein and the first reducer node provided in the foregoing method embodiments (Embodiment 1, Embodiment 2, Embodiment 3, and Embodiment 4) have same functions, and perform actions according to a same principle. For brevity, no specific description is made herein to functions of the first mapper node and the first reducer node in Embodiment 8 and work that can be performed by the first mapper node and the first reducer node. Reference may be directly made to the corresponding action descriptions provided in the method procedures provided in Embodiment 1, Embodiment 2, Embodiment 3, and Embodiment 4. Optionally, the first mapper node is implemented by the data processing apparatus in Embodiment 5, and the first reducer node is implemented by the data processing apparatus in Embodiment 6.

The first mapper node is configured to execute a map task on a data slice, and obtain at least one data segment according to an execution result of the map task, where each of the at least one data segment is to be processed by a corresponding reducer node, the at least one data segment includes a first data segment, and the first data segment is a data segment to be processed by the first reducer node, store the first data segment into a remote shared partition in a format of a file, respond to a data request message, and generate a response message according to an identifier of the first reducer node, where the response message includes a partition name of the remote shared partition that stores the first data segment and a file name of a file including the first data segment, and feedback the response message to the first reducer node.

The first reducer node is configured to send the data request message to the first mapper node after learning that the first mapper node stores the first data segment into the remote shared partition, where the data request message includes the identifier of the first reducer node, receive the response message fed back by the first mapper node, and obtain, according to the response information, the first data segment from the file stored in the remote shared partition, and execute a reduce task on the first data segment.

Optionally, the storage pool includes a first remote private partition exclusive to the first mapper node.

That the first mapper node is configured to obtain at least one data segment according to an execution result of the map task includes that the first mapper node is configured to store a spill file that is spilled when the first mapper node executes the map task, into the first remote private partition of the first mapper node, where a single spill file includes data that is spilled once from a buffer in a process in which the first mapper node executes the map task, and the buffer temporarily stores the execution result of the map task, and respectively merge, according to key values corresponding to different reducer nodes in the at least one reducer node, multiple spill files stored in the first remote private partition of the first mapper node, and obtain the at least one data segment by means of merging.

Optionally, a quantity of remote shared partitions is equal to a product of a quantity of mapper nodes and a quantity of reducer nodes, and each remote shared partition is shared by one mapper node and one reducer node.

That the first mapper node is configured to store the data segment into a remote shared partition in a format of a file includes that the first mapper node is configured to store the file including the first data segment into the remote shared partition shared by the first mapper node and the first reducer node.

That the first reducer node is configured to obtain, according to the response information, the first data segment from the file stored in the remote shared partition includes that the first reducer node is configured to determine, according to the partition name in the response information, the remote shared partition shared by the first mapper node and the first reducer node, and read, according to the file name in the response information, the first data segment from the remote shared partition shared by the first mapper node and the first reducer node.

Optionally, the storage pool includes a second remote private partition exclusive to the first reducer node.

The first reducer node is further configured to in a process of storing the first data segment read from the remote shared partition into a local memory, when usage of the local memory reaches preset usage, store the first data segment subsequently read from the remote shared partition into the second remote private partition of the first reducer node.

Optionally, the first mapper node is configured to access the remote shared partition in a mounting manner.

The first reducer node is configured to access the remote shared partition in a mounting manner.

It should be noted that although terms of "first," "second," "third," and the like may be used in the foregoing embodiment to describe units, storage messages, reducer nodes, and mapper nodes, for example to describe "a first reducer node," "a second reducer node," and "a third reducer node," which are not limited to the terms. In addition, the terms of "first," "second," "third," and the like are only used for mutual differentiation, and do not indicate a sequence relationship between the terms. For example, "the first reducer node" and "the second reducer node" neither indicate specified reducer nodes, nor indicate a sequence relationship between "the first reducer node" and "the second reducer node," "first" and "second" are used only for comparison to differentiate between input ports, and without departing from the scope of the embodiments of the present application, names of "the first reducer node" and "the second reducer node" may be interchanged, or the "the first reducer node" may be changed into a fourth reducer node. Therefore, in this embodiment of the present application, the terms of "first," "second" and the like are not limited.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions recorded in the foregoing embodiments or make equivalent replacements to some technical features thereof, without departing from the protection scope of the technical solutions of the embodiments of the present application.

What is claimed is:

1. A data processing method for a system comprising a central processing unit (CPU) pool and a storage pool comprising memory, wherein the data processing method comprises:
- executing, by a first mapper node in the CPU pool, a map task on a data slice, wherein the CPU pool is communicatively coupled to the storage pool and comprises at least two CPUs, at least one mapper node running in the CPU pool, and at least one reducer node running in the CPU pool, wherein at least one of the mapper nodes comprises the first mapper node, wherein at least one of the reducer nodes comprises a first reducer node, and wherein the first mapper node and the first reducer node run on different CPUs in the CPU pool;
- obtaining, by the first mapper node, at least one data segment according to an execution result of the map task, wherein at least one of the data segments comprises a first data segment, and wherein the first data segment is to be processed by the first reducer node, and wherein the first mapper node corresponds to the first reducer node;
- storing, by the first mapper node in a format of a file, the first data segment into a remote shared partition of the memory, wherein the remote shared partition of the memory is accessible to the first mapper node and the first reducer node, and wherein a quantity of remote shared partitions is equal to a product of a quantity of mapper nodes and a quantity of reducer nodes;
- receiving, by the first mapper node from the first reducer node, a data request message comprising an identifier of the first reducer node;
- generating, by the first mapper node, a response message according to the identifier of the first reducer node in response to receiving the data request message, wherein the response message comprises a partition name of the remote shared partition storing the first data segment and a file name of the file with the first data segment; and
- feeding, by the first mapper node, the response message back to the first reducer node.

2. The data processing method of claim 1, wherein the storage pool comprises a first remote private partition exclusive to the first mapper node, and wherein obtaining the at least one data segment comprises:
- storing, by the first mapper node, a spill file spilled into the first remote private partition of the first mapper node when the first mapper node executes the map task, wherein a single spill file comprises data spilled once from a buffer in a process in which the first mapper node executes the map task, and wherein the buffer temporarily stores the execution result of the map task;
- respectively merging, by the first mapper node according to key values corresponding to different reducer nodes in at least one of the reducer nodes, a plurality of spill files stored in the first remote private partition of the first mapper node; and
- obtaining, by the first mapper node, the first data segment by the merging.

3. The data processing method of claim 1, wherein the first mapper node accesses the remote shared partition in a mounting manner comprising connecting an existing directory to the remote shared partition.

4. The data processing method of claim 1, wherein the storage pool comprises a memory pool.

5. A computer device, comprising:
- at least one central processing unit (CPU) comprised in a CPU pool, wherein the CPU pool is communicatively coupled to a storage pool and runs at least one mapper node comprising a first mapper node and at least one reducer node comprising a first reducer node, wherein the first mapper node and the first reducer node run on different CPUs in the CPU pool, and wherein the first mapper node runs on one or more CPUs in the computer device; and
- at least one memory having a plurality of instructions stored thereon, when the instructions are executed by at least one of the CPUs to realize the first mapper node and cause the first mapper node to be configured to:
  - execute a map task on a data slice;
  - obtain at least one data segment according to an execution result of the map task, wherein at least one of the data segments comprises a first data segment, wherein the first data segment is to be processed by the first reducer node, and wherein the first mapper node corresponds to the first reducer node;
  - store the first data segment into a remote shared partition of the storage pool in a format of a file, wherein the remote shared partition of the storage pool is accessible to the first mapper node and the first reducer node, and wherein a quantity of remote shared partitions is equal to a product of a quantity of mapper nodes and a quantity of reducer nodes;
  - receive a data request message from the first reducer node comprising an identifier of the first reducer node;
  - generate a response message according to the identifier of the first reducer node in response to receiving the data request message, wherein the response message comprises a partition name of the remote shared partition of the storage pool that stores the first data segment and a file name of the file comprising the first data segment; and
  - feedback the response message to the first reducer node.

6. The computer device of claim 5, wherein the storage pool comprises a first remote private partition exclusive to the first mapper node, and wherein the instructions further causing the first mapper node to be configured to:
- store a spill file spilled into the first remote private partition of the first mapper node when the first mapper node executes the map task, wherein a single spill file comprises data spilled once from a buffer in a process in which the one or more CPUs execute the map task, and wherein the buffer temporarily stores the execution result of the map task;
- respectively merge, according to key values corresponding to different reducer nodes in the at least one reducer node, a plurality of spill files stored in the first remote private partition of the first mapper node; and
- obtain at least one of the data segments by merging.

7. The computer device of claim 5, wherein the first mapper node accesses the remote shared partition in a mounting manner comprising connecting the remote shared partition to an existing directory as a file.

8. The computer device of claim 5, wherein the storage pool comprises a memory pool.

9. A data processing method for a system comprising a central processing unit (CPU) pool and a storage pool comprising memory, wherein the data processing method comprises:
sending, by a first reducer node in the CPU pool, a data request message to a first mapper node after the first mapper node stores a first data segment into a remote shared partition, wherein the data request message comprises an identifier of the first reducer node, wherein the first data segment comprises a data segment to be processed by the first reducer node, wherein the CPU pool is communicatively coupled to the storage pool and comprises at least two CPUs, wherein at least one mapper node comprises the first mapper node running in the CPU pool and at least one reducer node comprising the first reducer node running in the CPU pool, and wherein the first mapper node and the first reducer node run on different CPUs in the CPU pool;
receiving, by the first reducer node, a response message from the first mapper node in response to sending the data request message, wherein the response message comprises a partition name of a remote shared partition of the memory storing the first data segment and a file name of a file with the first data segment, wherein the remote shared partition of the memory is accessible to the first mapper node and the first reducer node, and wherein a quantity of remote shared partitions is equal to a product of a quantity of mapper nodes and a quantity of reducer nodes;
accessing, by the first reducer node according to the response message, the first data segment from the file stored in the remote shared partition comprises reading, by the first reducer node according to the file name in the response message, the first data segment from the remote shared partition shared by the first mapper node and the first reducer node; and
executing, by the first reducer node, a reduce task on the first data segment.

10. The data processing method of claim 9, wherein the storage pool comprises a second remote private partition exclusive to the first reducer node, and wherein the data processing method further comprises storing, by the first reducer node, the first data segment subsequently read from the remote shared partition into the second remote private partition of the first reducer node when storing the first data segment read from the remote shared partition into a local memory and when usage of the local memory reaches preset usage.

11. The data processing method of claim 9, wherein the first reducer node accesses the remote shared partition in a mounting manner comprising connecting an existing directory to the remote shared partition.

12. The data processing method of claim 9, wherein the storage pool comprises a memory pool.

13. A computer device, comprising:
at least one central processing unit (CPU) comprised in a CPU pool, wherein the CPU pool is communicatively coupled to a storage pool comprising memory, wherein the CPU pool runs at least one mapper node comprising a first mapper node and at least one reducer node comprising a first reducer node, wherein the first mapper node and the first reducer node run on different CPUs in the CPU pool, wherein the first reducer node runs on one or more CPUs in the computer device; and
at least one memory having a plurality of instructions stored thereon, wherein the instructions are executed by at least one of the CPUs in the computer device to realize the first reducer node and cause the first reducer node to be configured to:
send a data request message to the first mapper node after a first data segment is stored into a remote shared partition of the memory, wherein the data request message comprises an identifier of the first reducer node, and wherein the first data segment comprises a data segment to be processed by the first reducer node;
receive a response message from the first mapper node in response to sending the data request message, wherein the response message comprises a partition name of the remote shared partition of the memory storing the first data segment and a file name of a file with the first data segment, wherein the remote shared partition of the memory is accessible to the first mapper node and the first reducer node, and wherein a quantity of remote shared partitions is equal to a product of a quantity of mapper nodes and a quantity of reducer nodes;
access, according to the response message, the first data segment from the file stored in the remote shared partition; and
execute a reduce task on the first data segent.

14. The computer device of claim 13, wherein each remote shared partition is shared by one mapper node and one reducer node, and wherein the instructions further cause the first reducer node to be configured to read, according to the file name in the response message, the first data segment from the remote shared partition shared by the first mapper node and the first reducer node.

15. The computer device of claim 13, wherein the storage pool comprises a second remote private partition exclusive to the first reducer node, and wherein the instructions further cause the first reducer node to be configured to store the first data segment subsequently read from the remote shared partition into the second remote private partition of the first reducer node when storing the first data segment read from the remote shared partition into a local memory and when usage of the local memory reaches preset usage.

16. The computer device of claim 13, wherein the first reducer node accesses the remote shared partition in a mounting manner comprising connecting an existing directory to the remote shared partition.

17. The computer device of claim 13, wherein the storage pool comprises a memory pool.

* * * * *